United States Patent
Reed

(10) Patent No.: US 7,426,214 B2
(45) Date of Patent: *Sep. 16, 2008

(54) MULTIPLE LEVEL MINIMUM LOGIC NETWORK

(75) Inventor: Coke S. Reed, Cranbury, NJ (US)

(73) Assignee: Interactic Holdings, LLC, New York, NY (US)

( * ) Notice: Subject to any disclaimer, the term of this patent is extended or adjusted under 35 U.S.C. 154(b) by 695 days.

This patent is subject to a terminal disclaimer.

(21) Appl. No.: 10/773,693

(22) Filed: Jun. 16, 2004

(65) Prior Publication Data

US 2007/0186008 A1    Aug. 9, 2007

Related U.S. Application Data

(60) Continuation of application No. 09/852,009, filed on May 7, 2001, now Pat. No. 7,068,671, and a division of application No. 09/850,953, filed on May 7, 2001, now abandoned, and a division of application No. 09/397,333, filed on Sep. 14, 1999, now Pat. No. 6,272,141, and a division of application No. 08/505,513, filed on Jul. 21, 1995, now Pat. No. 5,996,020.

(51) Int. Cl.
*H04L 12/28* (2006.01)
*H04L 12/56* (2006.01)

(52) U.S. Cl. .................. 370/404; 370/258; 709/238

(58) Field of Classification Search ............... 370/404, 370/258

See application file for complete search history.

(56) References Cited

U.S. PATENT DOCUMENTS

| | | | | | |
|---|---|---|---|---|---|
| 5,684,959 | A | * | 11/1997 | Bhat et al. | 709/224 |
| 5,715,251 | A | * | 2/1998 | Du | 370/404 |
| 5,737,320 | A | * | 4/1998 | Madonna | 370/258 |
| 5,781,551 | A | * | 7/1998 | Born | 370/408 |

\* cited by examiner

*Primary Examiner*—Brian D Nguyen
(74) *Attorney, Agent, or Firm*—Koestner Bertani LLP; Ken J. Koestner

(57) ABSTRACT

A network or interconnect structure 100 utilizes a data flow technique that is based on timing and positioning of messages communicating through the interconnect structure. Switching control is distributed throughout multiple nodes 102 in the structure so that a supervisory controller providing a global control function and complex logic structures are avoided. The interconnect structure operates as a "deflection" or "hot potato" system in which processing and storage overhead at each node is minimized. Elimination of a global controller and buffering at the nodes greatly reduces the amount of control and logic structures in the interconnect structure, simplifying overall control components and network interconnect components 104 and improving speed performance of message communication.

19 Claims, 30 Drawing Sheets

MULTIPLE LEVEL MINIMUM LOGIC NETWORK

RELATED APPLICATIONS

This application is a continuation of Ser. No. 09/852009 filed May 7, 2001 U.S. Pat. No. 7,068,671, a division of U.S. patent application Ser. No. 09/850,953, filed May 7, 2001 now abandoned, and a division of Ser. No. 09/397333, filed Sep. 14, 1999 U.S. Pat No. 6,272,141 and Ser. No. 08/505513 filed Jul. 21, 1995 U.S. Pat. No. 5,996,020, all entitled "Minimum Level Minimum Logic Network", invented by Coke S. Reed, claiming an earliest effective filing date of Jul. 21, 1995.

FIELD OF INVENTION

The present invention relates to interconnection structures for computing and communication systems. More specifically, the present invention relates to multiple level interconnection structures in which control and logic circuits are minimized.

BACKGROUND OF THE INVENTION

Many advanced computing systems, including supercomputers for example, utilize multiple computational units to improve performance in what is called a parallel system. The system of interconnections among parallel computational units is an important characteristic for determining performance. One technique for interconnecting parallel computational units involves construction of a communication network similar to a telephone network in which groups of network elements are connected to switching systems. The switching systems are interconnected in a hierarchical manner so that any switching station manages a workable number of connections.

One disadvantage of a network connection is an increase in the latency of access to another computational unit since transmission of a message traverses several stages of a network. Typically, periods of peak activity occur in which the network is saturated with numerous messages so that many messages simultaneously contend for the use of a switching station. Various network types have been devised with goals of reducing congestion, improving transmission speed and achieving a reasonable cost. These goals are typically attained by rapidly communicating between nodes and minimizing the number of interconnections that a node must support.

One conventional interconnection scheme is a ring of nodes with each node connected to two other nodes so that the line of interconnections forms a circle. The definition of a ring, in accordance with a standard definition of a ring network in the art of computing (*IBM Dictionary of Computing*, McDaniel G. ed., McGraw-Hill, Inc., 1994, p. 584) is a network configuration in which devices are connected by unidirectional transmission links to form a closed path. Another simple conventional scheme is a mesh in which each node is connected to its four nearest neighbors. The ring and mesh techniques advantageously limit the number of interconnections supported by a node. Unfortunately, the ring and mesh networks typically are plagued by lengthy delays in message communication since the number of nodes traversed in sending a message from one node to another may be quite large. These lengthy delays commonly cause a computational unit to remain idle awaiting a message in transit to the unit.

The earliest networks, generally beginning with telephone networks, utilize circuit switching in which each message is routed through the network along a dedicated path that is reserved for the duration of the communication analogous to a direct connection via a single circuit between the communicating parties. Circuit switching disadvantageously requires a lengthy setup time. Such delays are intolerable during the short and quick exchanges that take place between different computational units. Furthermore, a dedicated pathway is very wasteful of system bandwidth. One technique for solving the problems arising using circuit switching is called packet switching in which messages sent from one computational unit to another does not travel in a continuous stream to a dedicated circuit. Instead, each computational unit is connected to a node that subdivides messages into a sequence of data packets. A message contains an arbitrary sequence of binary digits that are preceded by addressing information. The length of the entire message is limited to a defined maximum length. A "header" containing at least the destination address and a sequence number is attached to each packet, and the packets are sent across the network. Addresses are read and packets are delivered within a fraction of a second. No circuit setup delay is imposed because no circuit is set up. System bandwidth is not wasted since there is no individual connection between two computational units. However, a small portion of the communication capacity is used for routing information, headers and other control information. When communication advances in isolated, short bursts, packet switching more efficiently utilizes network capacity. Because no transmission capacity is specifically reserved for an individual computational unit, time gaps between packets are filled with packets from other users. Packet switching implements a type of distributed multiplexing system by enabling all users to share lines on the network continuously.

Advances in technology result in improvement in computer system performance. However, the manner in which these technological advances are implemented will greatly determine the extent of improvement in performance. For example, performance improvements arising from completely optical computing strongly depend on an interconnection scheme that best exploits the advantages of optical technology.

SUMMARY OF THE INVENTION

In accordance with the present invention, a multiple level minimum logic network interconnect structure has a very high bandwidth and low latency. Control of interconnect structure switching is distributed throughout multiple nodes in the structure so that a supervisory controller providing a global control function is not necessary. A global control function is eliminated and complex logic structures are avoided by a novel data flow technique that is based on timing and positioning of messages communicating through the interconnect structure. Furthermore, the interconnect structure implements a "deflection" or "hot potato" design in which processing and storage overhead at each node is minimized by routing a message packet through an additional output port rather than holding the packet until a desired output port is available. Accordingly, the usage of buffers at the nodes is eliminated. Elimination of a global controller and buffering at the nodes greatly reduces the amount of control and logic structures in the interconnect structure, simplifying overall control components and network interconnect components, improving speed performance of message communication and potentially reducing interconnection costs substantially. Implementation of the interconnect structure is highly flexible so that fully electronic, fully optical and mixed electronic-optical embodiments are achieved. An implementation using all optical switches is facilitated by nodes exploiting uniquely simple logic and elimination of buffering at the nodes.

The multiple level minimum logic network interconnect architecture is used for various purposes. For example, in some embodiments the architecture is used as an interconnect structure for a massively parallel computer such as a supercomputer. In other exemplary embodiments, the architecture forms an interconnect structure linking a group of workstations, computers, terminals, ATM machines, elements of a national flight control system and the like. Another usage is an interconnect structure in various A telecommunications applications or an interconnect structure for numerous schedulers operating in a business main frame.

In accordance with one aspect of the present invention, an interconnect apparatus includes a plurality of nodes and a plurality of interconnect lines selectively connecting the nodes in a multiple level structure in which the levels include a richly interconnected collection of rings. The multiple level structure includes a plurality of J+1 levels in a hierarchy of levels and a plurality of $2^J K$ nodes at each level. If integer K is an odd number, the nodes on a level M are situated on $2^{J-M}$ rings with each ring including $2^M K$ nodes. Message data leaves the interconnect structure from nodes on a level zero. Each node has multiple communication terminals. Some are message data input and output terminals. Others are control input and output terminals. For example, a node A on level 0, the innermost level, receives message data from a node B on level 0 and also receives message data from a node C on level 1. Node A sends message data to a node D on level 0 and also sends message data to a device E that is typically outside the interconnect structure. One example of a device E is an input buffer of a computational unit. Node A receives a control input signal from a device F which is commonly outside the interconnect structure. An example of a device F is an input buffer of a computational unit. Node A sends a control signal to a node G on level 1.

All message data enters the interconnect structure on an outermost level J. For example, a node A on level J, the outermost level, receives message data from a node B on level J and also receives message data from a device C that is outside the interconnect structure. One example of device C is an output buffer of a computational unit. Node A sends message data to a node D on level J and also sends message data to a node E on level J−1. Node A receives a control input signal from a node F on level J−1. Node A sends a control signal to a device G that is typically outside the interconnect structure. An example of a device G is an output buffer of a computational unit.

Nodes between the innermost level 0 and the outermost level J communicate message data and control signals among other nodes. For example, a node A on a level T that is neither level 0 or level J receives message data from a node B on level T and also receives message data from a node C on level T+1. Node A sends message data to a node D on level T and also sends message data to a node E on level T−1. Node A receives a control input signal from a node F on level T−1. Node A sends a control signal to a node G on level T+1.

Level M has $2^{j-m}$ rings, each containing $2^M K$ nodes for a total of $2^J K$ nodes on level M. Specifically:

Level 0 has $2^j$ rings, each containing $2^0 K = K$ nodes for a total of $2^J K$ nodes on level 0.

Level 1 has $2^{j-1}$ rings, each containing $2^1 K = 2K$ nodes for a total of $2^J K$ nodes on level 1.

Level 2 has $2^{j-2}$ rings, each containing $2^2 K = 4K$ nodes for a total of $2^J K$ nodes on level M.

Level J−2 has $2^{j-(J-2)} = 4$ rings, each containing $2^{(J-2)} K$ nodes for a total of $2^J K$ nodes on level J−2.

Level J−1 has $2^{J-(J-1)} = 2$ rings, each containing $2^{(J-1)} K$ nodes for a total of $2^J K$ nodes on level J−1.

Level J has $2^{J-J} = 1$ ring containing $2^{(J-0)} K$ nodes for a total of $2^J K$ nodes on level J.

For a ring $R_T$ on a level T which is not the outermost level J, then one ring $R_{T+1}$ on level T+1 exists such that each node A on ring $R_T$ receives data from a node B on ring $R_T$ and a node C on ring $R_{T+1}$. For a ring $R_T$ on a level T which is not the innermost level 0, then there exist exactly two rings $R1_{T-1}$ and $R2_{T-1}$ on level T−1 such that a node A on ring $R_T$ sends message data to a node D on ring $R_T$ and a node E on either ring $R1_{T-1}$ or ring $R2_{T-1}$. A message on any level M of the interconnect structure can travel to two of the rings on level M−1 and is eventually able to travel to $2^M$ of the rings on level 0.

In the following discussion a "predecessor" of a node sends message data to that node. An "immediate predecessor" sends message data to a node on the same ring. A "successor" of a node receives message data from that node. An "immediate successor" receives message data to a node on the same ring.

For a node ART on ring RT on level T, there are nodes BRT and DRT on ring RT of level T such that node BRT is an immediate predecessor of node ART and node DRT is an immediate successor of node ART. Node ART receives message data from node BRT and sends message data to node DRT. Node ART receives message data from a device C that is not on the ring RT and sends data to a device E that is not on ring RT. If the level is not the innermost level 0, then device E is a node on level T−1 and there is an immediate predecessor node F on the same ring as device E. Node ART receives control information from device F. If node ART is on node T equal to zero, then device E is outside the interconnect structure and device E sends control information to node ART. For example, if device E is an input buffer of a computational unit, then the control information from device E to node ART indicates to node ART whether device E is ready to receive message data from node ART. Node DRT receives message data from a device G that is not on ring RT. Node ART sends a control signal to device G.

Control information is conveyed to resolve data transmission conflicts in the interconnect structure. Each node is a successor to a node on the adjacent outer level and an immediate successor to a node on the same level. Message data from the immediate successor has priority. Control information is send from nodes on a level to nodes on the adjacent outer level to warn of impending conflicts.

When the levels are evenly spaced and the nodes on each ring and each level are evenly spaced, the interconnect structure forms a three-dimensional cylindrical structure. The interconnect structure is fully defined by designating the interconnections for each node A of each level T to devices or nodes B, C, D, E, F and G. Each node or device has a location designated in three-dimensional cylindrical coordinates (r,è, z) where radius r is an integer which specifies the cylinder number from 0 to J, angle è is an integer multiple of $2\delta/K$, which specifies the spacing of nodes around the circular cross-section of a cylinder from 0 to K−1, and height z is a binary integer which specifies distance along the z-axis from 0 to $2^J-1$. Height z is expressed as a binary number because the interconnection between nodes in the z-dimension is most easily described as a binary digit manipulation. On the innermost level 0, one ring is spanned in one pass through the angles è from 0 to K−1 and each height z designates a ring. On level 1, one ring is spanned in two passes through the angles è and two heights z are used to designate one ring. The ring structure proceeds in this manner through the outermost ring J in which one ring is spanned in all $2^J$ heights along the z-axis.

Node A on a ring R receives message data from a node B, which is an immediate predecessor of node A on ring R. For a node A located at a node position N(r,è,z), node B is positioned at N(r, (è−1)mod K,$H_r$(z)) on level r. (è−1)mod K is equal to K−1 when è is equal to 0 and equal to è−1 otherwise. The conversion of z to $H_r$(z) on a level r is described for z=[$z_{J-1}$, $z_{J-2}$, . . . , $z_r$, $z_{r-1}$, . . . , $z_2$, $z_1$, $z_0$] by reversing the order of low-order z bits from $z_{r-1}$ to $z_0$] into the form z=[$z_{J-1}$, $z_{J-2}$, . . . , $z_r$, $z_0$, $z_1$, $z_2$, . . . , $z_{r-1}$], subtracting one (modulus $2^r$) from the low-order bits and reversing back the modified low-order z bits.

Node A also receives message data from a device C which is not on level r. If node A is positioned on the outermost level r=J, then device C is outside of the interconnect structure. If node A is not positioned on the outermost level, then device C is a node located at position N(r+1,(è−1)mod K,z) on level r+1.

Node A sends message data to a node D, which is an immediate successor to node A on ring R. Node D is located at node position N(r, (è+1)mod K,$h_r$(z)) on level r. (è+1)mod K is equal 0 when è is equal to K−1 and equal to è+1 otherwise. The conversion of z to $h_r$(z) on a level r is described for z=[$z_{J-1}$, $z_{J-2}$, . . . , $z_r$, $z_{r-1}$, . . . , $z_2$, $z_1$, $z_0$] by reversing the order of low-order z bits from $z_{r-1}$ to $z_0$] into the form z=[$z_{J-1}$, $z_{J-2}$, . . . , $z_r$, $z_0$, $z_1$, $z_2$, . . . , $z_{r-1}$], adding one (modulus $2^r$) to the low-order bits and reversing back the low-order z bits.

Note that the term hr looks forward in z and the term $H_r$ looks backward. Thus, $h_r$ and $H_r$ are mutual inverse so that $H_r(h_r(z))=h_r(H_r(z))=z$.

Node A also sends message data to a device E that is not on the same level r as node A. If node A is on the innermost level r=0, node A at node position N(r,è,z) is interconnected with a device (e.g. a computational unit) outside of the interconnect structure. Otherwise, node A is interconnected to send message data to device E, which is a node located at node position N(r−1, (è+1)mod K,z) on level r−1.

Node A receives control information from a device F. If node A is on the innermost level r=0, the device F is the same as device E. If node A is not on the innermost level, device F is a node which is distinct from the device E. Node F is located at node position N(r−1,è,$H_{r-1}$(z)) on level r−1.

Node A sends control information to a device G. If node A is on the outermost level r=J, then device G is positioned outside of the interconnect structure. Device G is a device, for example a computational unit, that sends message data to node D. If node A is not positioned on level r=J, then device G is a node which is located at node position N(r+1, θ,$h_r$(z)) on level r+1 and device G sends message data to node D.

In accordance with a second aspect of the present invention, a method is shown of transmitting a message from a node N to a target destination in a first, a second and a third dimension of three dimensions in an interconnect structure arranged as a plurality of nodes in a topology of the three dimensions. The method includes the steps of determining whether a node en route to the target destination in the first and second dimensions and advancing one level toward the destination level of the third dimension is blocked by another message, advancing the message one level toward the destination level of the third dimension when the en route node is not blocked and moving the message in the first and second dimensions along a constant level in the third dimension otherwise. This method further includes the step of specifying the third dimension to describe a plurality of levels and specifying the first and second dimensions to described a plurality of nodes on each level. A control signal is sent from the node en route to the node N on a level q in the third dimension, the control signal specifying whether the node en route is blocked. Transmission of a message is timed using a global clock specifying timing intervals to keep integral time modulus the number of nodes at a particular cylindrical height, the global clock time interval being equal to the second time interval and the first time interval being smaller than the global time interval. A first time interval a is set for moving the message in only the first and second dimensions. A second time interval á-â is set for advancing the message one level toward the destination level. A third time interval is set for sending the control signal from the node en route to the node N, the third time interval being equal to â.

In accordance with a third aspect of the present invention, a method is shown of transmitting a message from an input device to an output device through an interconnect structure. The message travels through the interconnect structure connecting a plurality of nodes in a three dimensional structure. The message has a target destination corresponding to a target ring on level 0 of the interconnect structure. A message M at a node N on level T en route to a target ring on level 0 advances to a node N' on level T−1 so long as the target ring is accessible from node N' and no other higher priority message is progressing to node N' to block the progress of message M. Whether the target ring is accessible from node N' is typically efficiently determined by testing a single bit of a binary code designating the target ring. Whether a higher priority message is blocking the progress of message M is efficiently determined using timed control signals. If a message is blocked at a time t, the message is in position to progress to the next level at time t+2. If a message is blocked by a message M' on level T−1, then a limited time duration will transpire before the message M' is able to block message M again.

A global clock controls traffic flow in the interconnect structure. Data flow follows rules that allow much of the control information to be "hidden" in system timing so that, rather than encoding all control information in a message packet header, timing considerations convey some information. For example, the target ring is encoded in the message packet header but, in some embodiments of the interconnect structure, designation of the target computational unit is determined by the timing of arrival of a message with respect to time on the global clock.

The disclosed multiple level interconnect structure has many advantages. One advantage is that the structure is simple, highly ordered and achieves fast and efficient communication for systems having a wide range of sizes, from small systems to enormous systems.

In addition, the interconnect structure is highly advantageous for many reasons. The interconnect structure resolves contention among messages directed toward the same node and ensures that a message that is blocked makes a complete tour of the nodes on a level before the blocking message is in position to block again. In this manner, a message inherently moves to cover all possible paths to the next level. A blocking message typically proceeds to subsequent levels so that overlying messages are not blocked for long.

BRIEF DESCRIPTION OF THE DRAWINGS

The features of the invention believed to be novel are specifically set forth in the appended claims. However, the invention itself, both as to its structure and method of operation, may best be understood by referring to the following description and accompanying drawings.

DETAILED DESCRIPTION

Figure 1A:
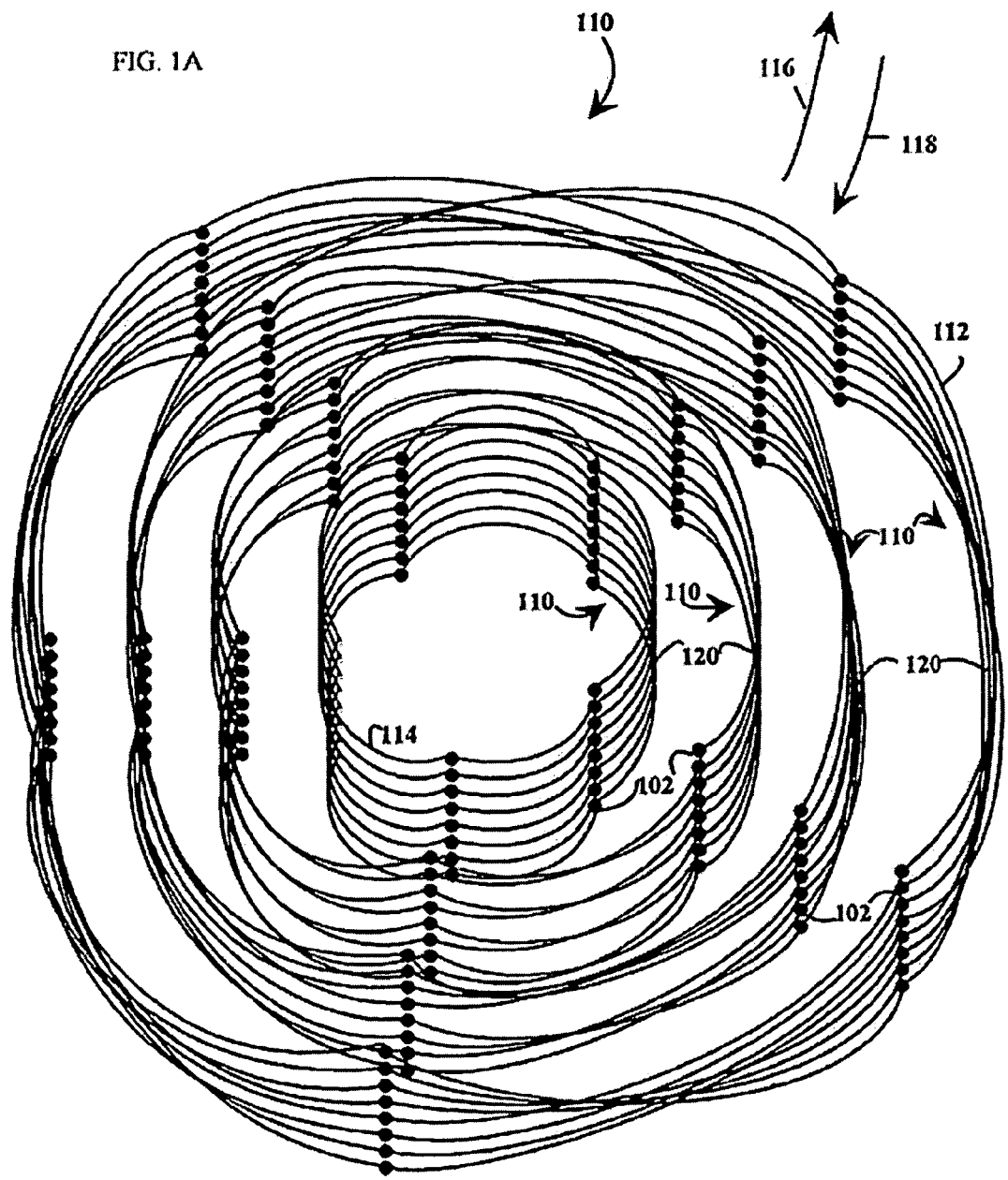
FIGS. 1A, 1B, 1C and 1D are abstract three-dimensional pictorial illustrations of the structure of an embodiment of a multiple level minimum logic interconnect apparatus.

Referring to FIGS. 1A, 1B, 1C and 1D, an embodiment of a multiple level minimum logic interconnect apparatus 100 includes multiple nodes 102 which are connected in a multiple level interconnect structure by interconnect lines. The multiple level interconnect structure is shown illustratively as a three-dimensional structure to facilitate understanding.

The nodes 102 in the multiple level interconnect structure are arranged to include multiple levels 110, each level 110 having a hierarchical significance so that, after a message is initiated in the structure, the messages generally move from an initial level 112 to a final level 114 in the direction of levels of a previous hierarchical significance 116 to levels of a subsequent hierarchical significance 118. Illustratively, each level 110 includes multiple structures which are called rings 120. Each ring 120 includes multiple nodes 102. The term "rings" is used merely to facilitate understanding of the structure of a network in the abstract in which visualization of the structure as a collection of concentric cylindrical levels 110 is useful.

Figure 1B:
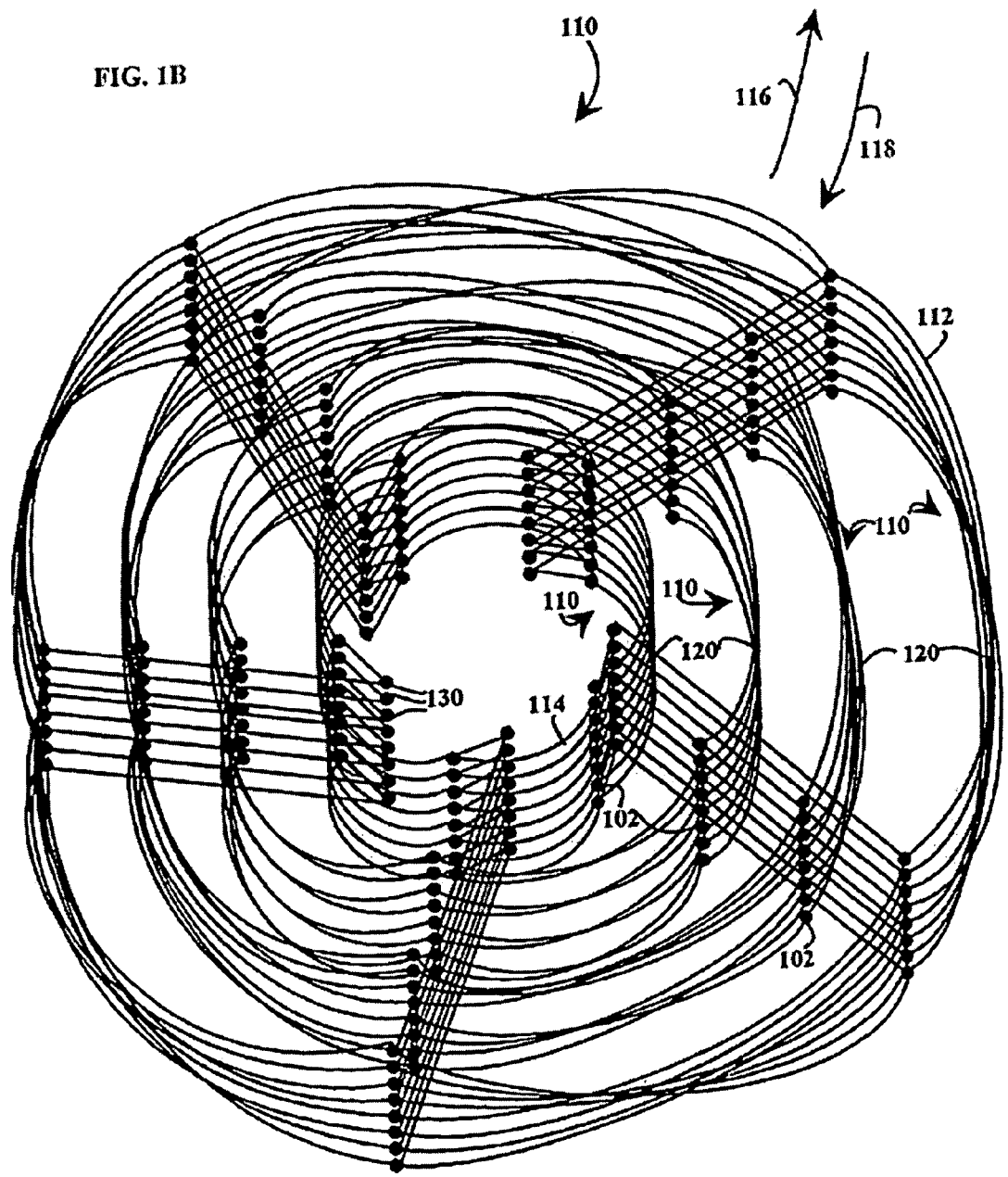
Figure 1C:
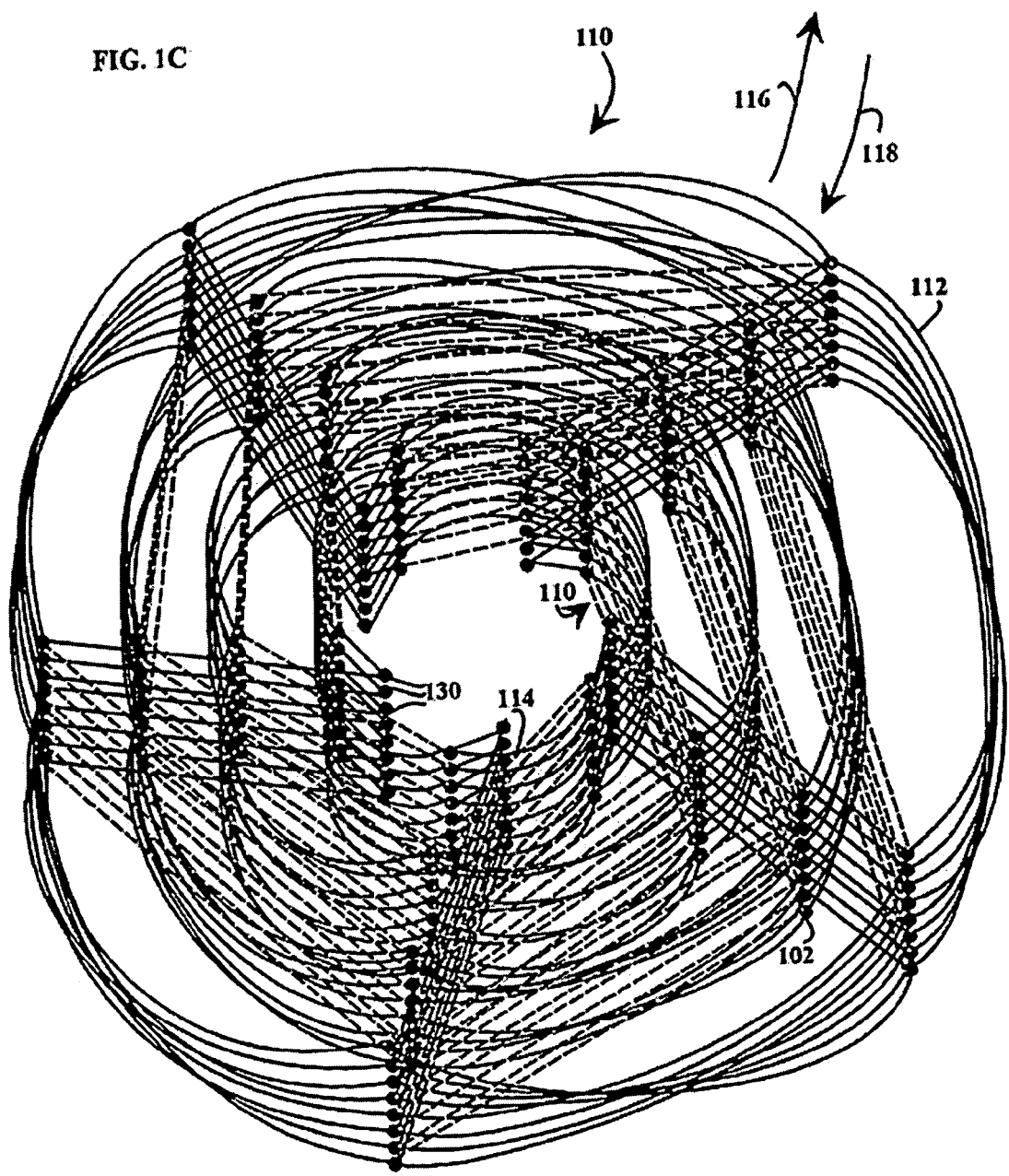
Figure 1D:
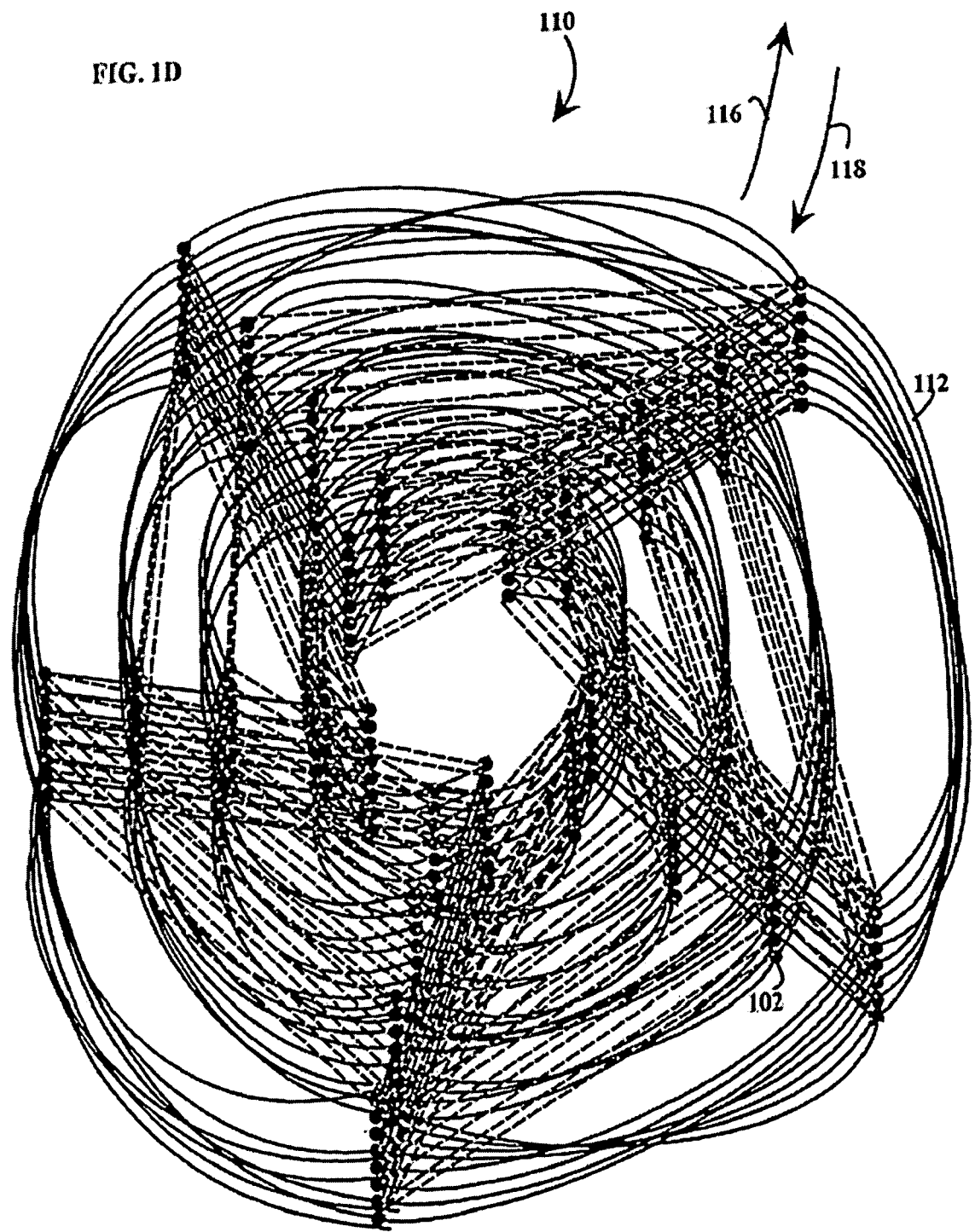

The different FIGS. 1A, 1B, 1C and 1D are included to more easily visualize and understand the interconnections between nodes. FIG. 1A illustrates message data transmission interconnections between nodes 102 on the various cylindrical levels 110. FIG. 1B adds a depiction of message data transmission interconnections between nodes 102 and devices 130 to the interconnections illustrated in FIG. 1A. FIG. 1C further shows message data interconnections between nodes 102 on different levels. FIG. 1D cumulatively shows the interconnections shown in FIGS. 1A, 1B and 1C in addition to control interconnections between the nodes 102.

The actual physical geometry of an interconnect structure is not to be limited to a cylindrical structure. What is important is that multiple nodes are arranged in a first class of groups and the first class of groups are arranged into a second class of groups. Reference to the first class of groups as rings and the second class of groups as levels is meant to be instructive but not limiting.

The illustrative interconnect apparatus 100 has a structure which includes a plurality of J+1 levels 110. Each level 110 includes a plurality of $2^J K$ nodes 102. Each level M contains $2^{J-M}$ rings 120, each containing $2^M K$ nodes 102. The total number of nodes 102 in the entire structure is $(J+1)2^J K$. The interconnect apparatus 100 also includes a plurality $2^J K$ devices 130. In the illustrative embodiment, each device of the $2^J K$ devices 130 is connected to a data output port of each of the K nodes 102 in each ring of the $2^J$ rings of the final level 114. Typically, in an interconnect structure of a computer a device 130 is a computational unit such as a processor-memory unit or a cluster of processor-memory units and input and output buffers.

Figure 2:
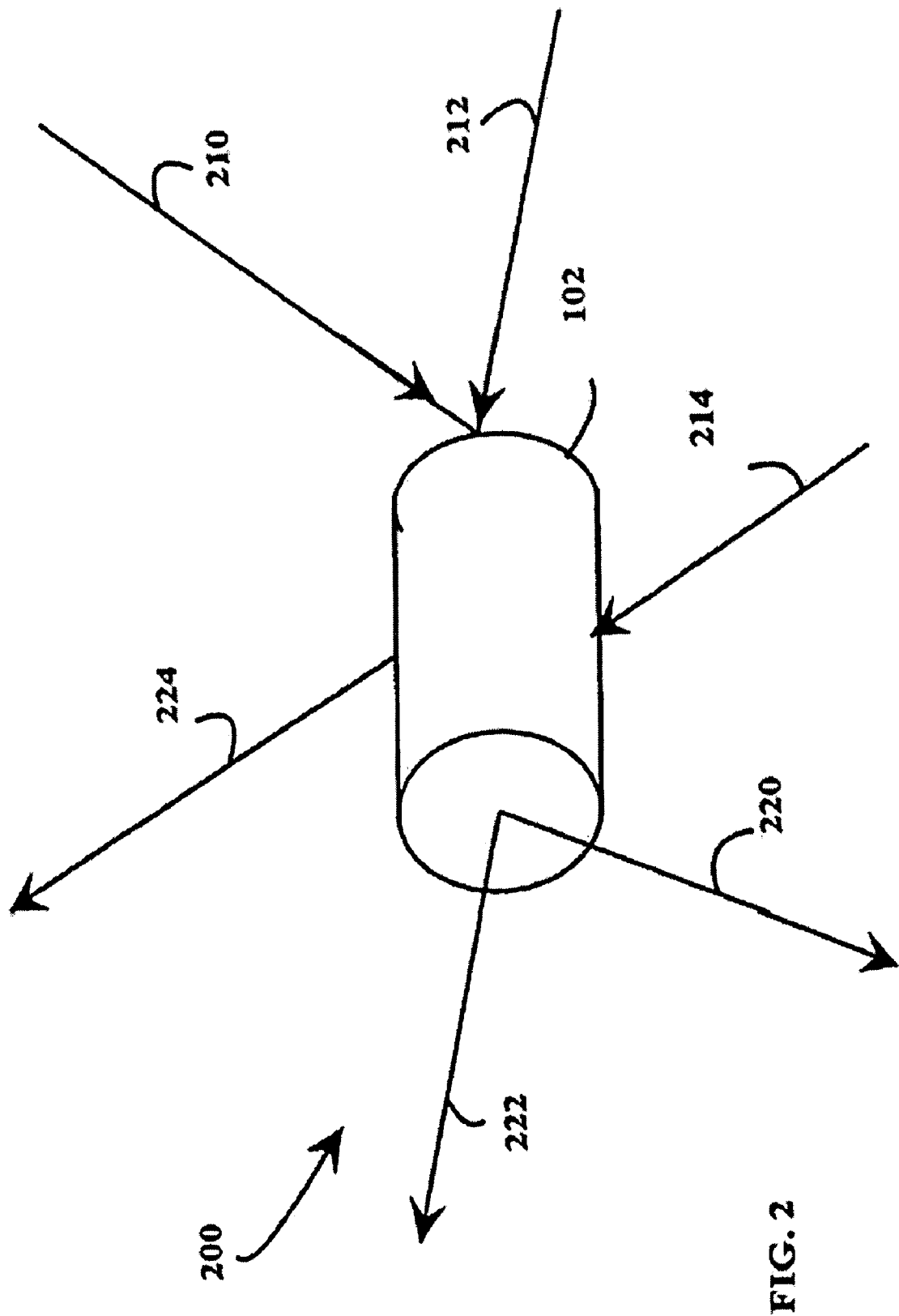
FIG. 2 is a schematic diagram of a node, node terminals and interconnection lines connected to the terminals.

Referring to FIG. 2, an interconnect structure 200 of a node 102 has three input terminals and three output terminals. The input terminals include a first data input terminal 210, a second data input terminal 212 and a control input terminal 214. The output terminals include a first data output terminal 220, a second data output terminal 222 and a control output terminal 224. The data input and output terminals of a node communicate message data with other nodes. The control terminals communicate control bits with other nodes for controlling transmission of message data. The number of control bits for controlling message transmission is efficiently reduced since much of the logic throughout the interconnect structure 200 is determined by timing of the receipt of control bits and message data in a manner to be detailed hereinafter. Only one control bit enters a node and only one control bit leaves at a given time step. Messages are communicated by generating a clock signal for timing time units. Message transmission is controlled so that, during one time unit, any node 102 receives message data from only one input terminal of the data input terminals 212 and 214. Since, a node 202 does not have a buffer, only one of the node's output ports is active in one time unit.

Referring to FIGS. 3 through 16, the topology of an interconnect structure 300 is illustrated. To facilitate understanding, the structure 300 is illustrated as a collection of concentric cylinders in three dimensions r, è and z. Each node or device has a location designated (r, è, z) which relates to a position (r, 2♂è/K, z) in three-dimensional cylindrical coordinates where radius r is an integer which specifies the cylinder number from 0 to J, angle è is an integer which specifies the spacing of nodes around the circular cross-section of a cylinder from 0 to K−1, and height z is a binary integer which specifies distance along the z-axis from 0 to $2^J-1$. Height z is expressed as a binary number because the interconnection between nodes in the z-dimension is most easily described as a manipulation of binary digits. Accordingly, an interconnect structure 300 is defined with respect to two design parameters J and K.

Figure 3A:
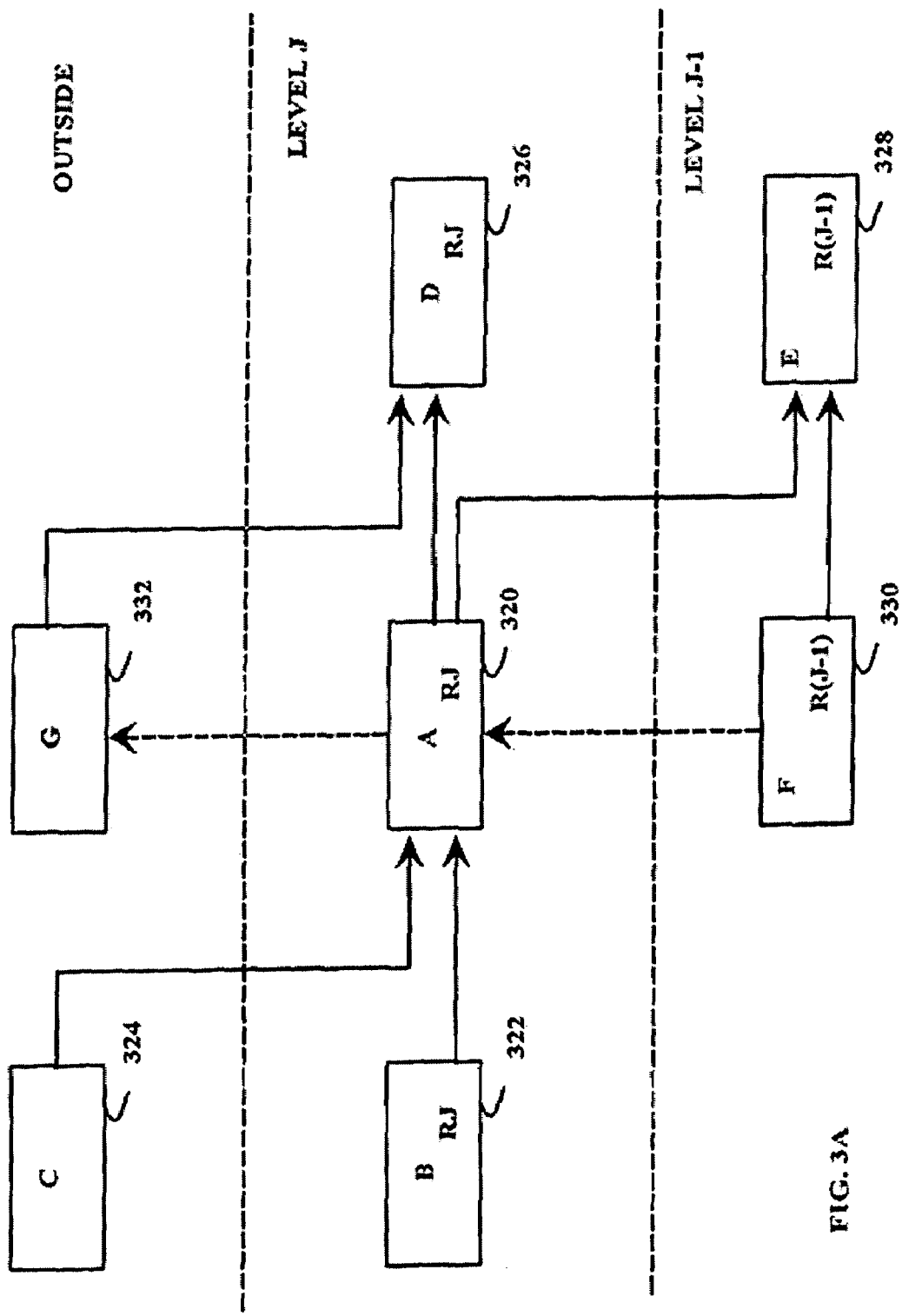
FIGS. 3A, 3B and 3C are schematic block diagrams that illustrate interconnections of nodes on various levels of the interconnect structure.
Figure 3B:
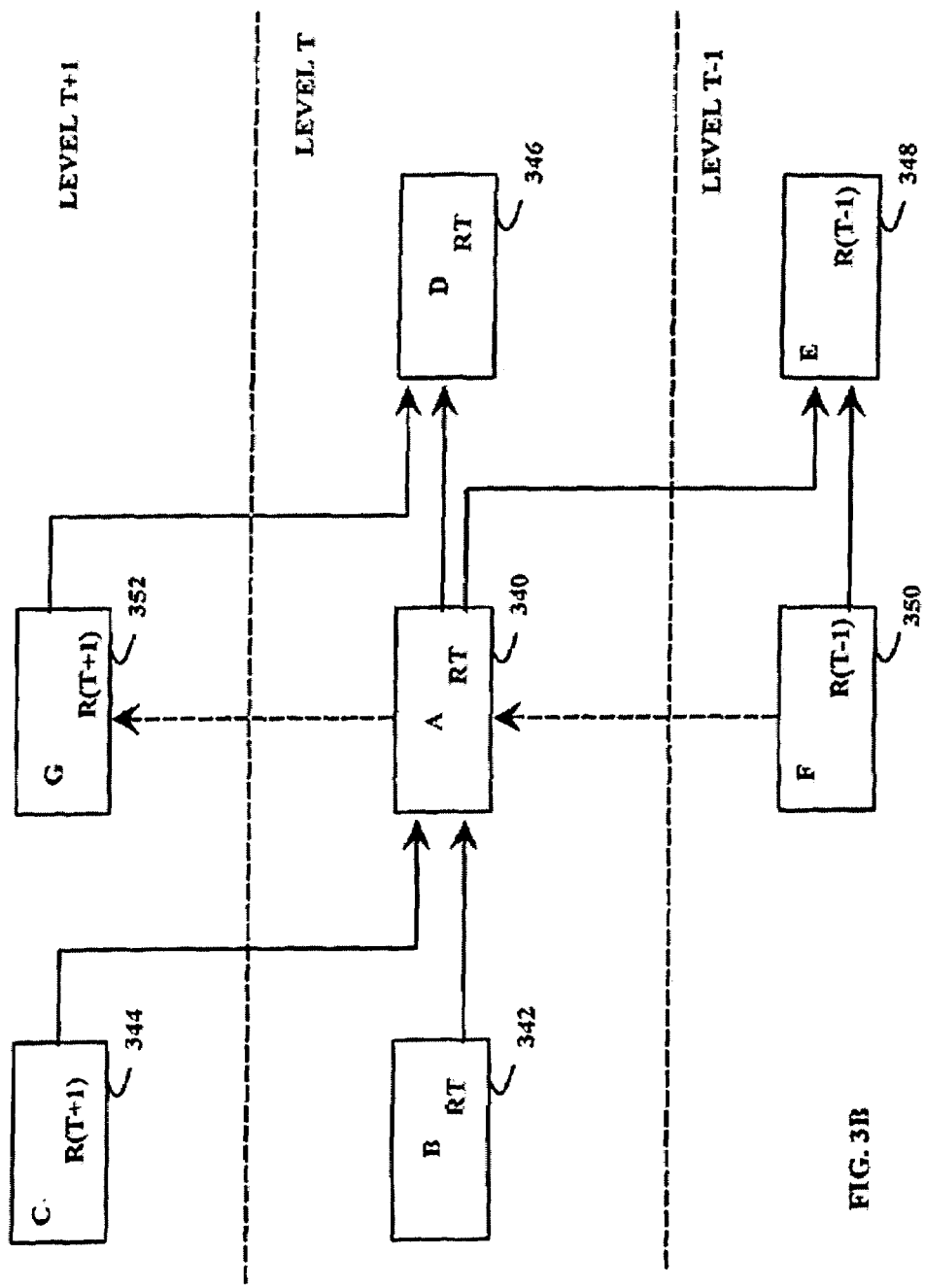
Figure 3C:
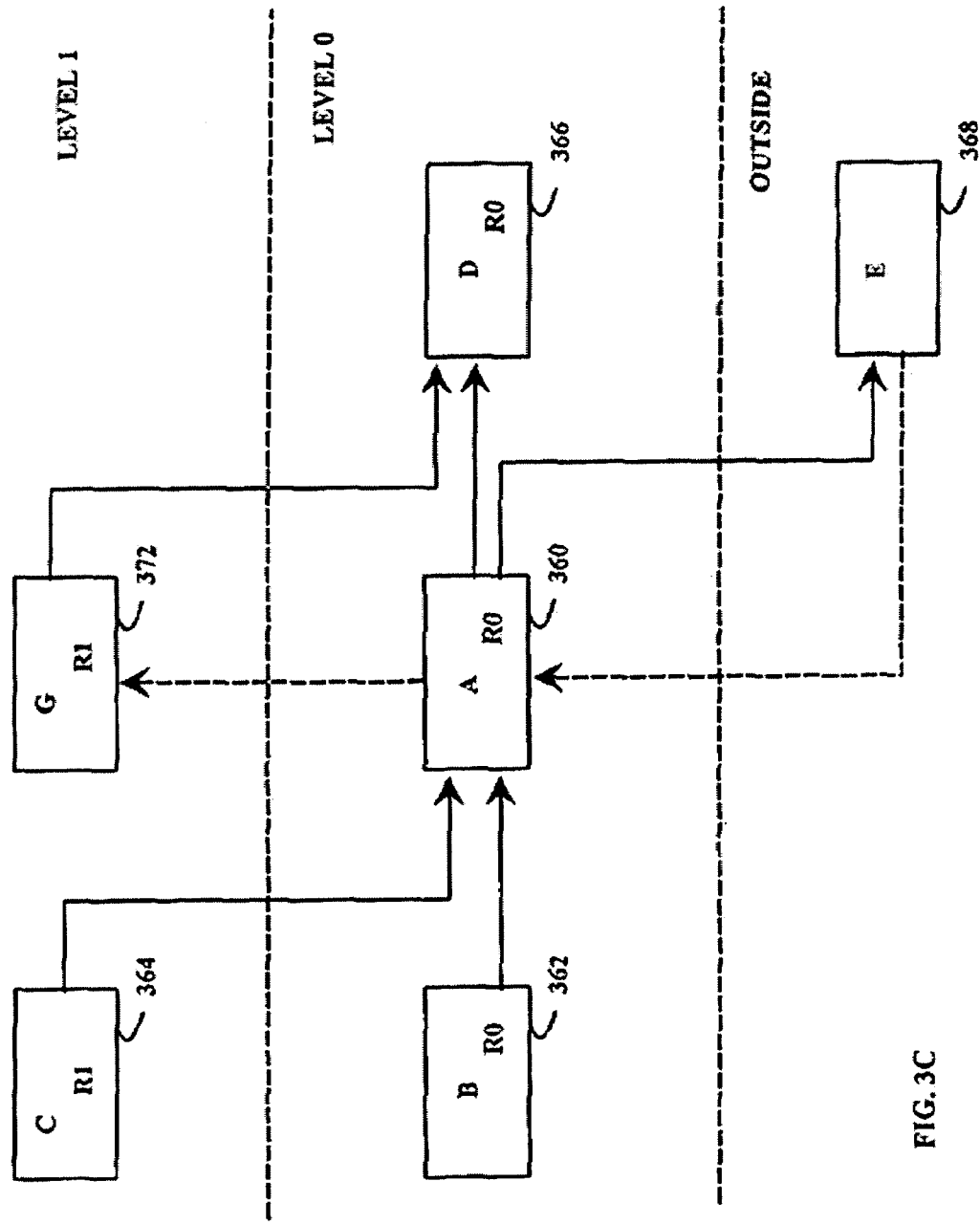

FIGS. 3A, 3B and 3C are schematic block diagrams that show interconnections of nodes on various levels of the interconnect structure. FIG. 3A shows a node $A_{RJ}$ 320 on a ring R of outermost level J and the interconnections of node $A_{RJ}$ 320 to node $B_{RJ}$ 322, device C 324, node $D_{RJ}$ 326, node $E_{R(J-1)}$ 328, node $F_{R(J-1)}$ 330 and device G 332. FIG. 3B shows a node $A_{RT}$ 340 on a ring R of a level J and the interconnections of node $A_{RT}$ 340 to node $B_{RT}$ 342, node $C_{R(T+1)}$ 344, node $D_{RT}$ 346, node $E_{R(T-1)}$ 348, node $F_{R(T-1)}$ 350 and node $G_{R(T+1)}$ 352. FIG. 3C shows a node $A_{R0}$ 360 on a ring R of innermost level 0 and the interconnections of node $A_{R0}$ 360 to node $B_{R0}$ 362, node $C_{R1}$ 364, node $D_{R0}$ 366, device E 368 and node $G_{R1}$ 372.

In FIGS. 3A, 3B and 3C interconnections are shown with solid lines with arrows indicating the direction of message data flow and dashed lines with arrows indicating the direction of control message flow. In summary, for nodes A, B and D and nodes or devices C, E, F, G:

(1) A is on level T.
(2) B and C send data to A.
(3) D and E receive data from A.
(4) F sends a control signal to A.
(5) G receives a control signal from A.
(6) B and D are on level T.
(7) B is the immediate predecessor of A.
(8) D is the immediate successor to A.
(9) C, E, F and G are not on level T.

The positions in three-dimensional cylindrical notation of the various nodes and devices is as follows:

(10) A is positioned at node N(r,è,z).
(11) B is positioned at node N(r, è−1, $H_T(z)$).
(12) C is either positioned at node N(r+1, è−1, z) or is outside the interconnect structure.
(13) D is positioned at node N(r, è+1, $h_T(z)$).
(14) E is either positioned at node N(r−1, è+1, z) or is outside the interconnect structure and the same as device F.
(15) F is either positioned at node N(r−1, è, $H_{T-1}(z)$) or is outside the interconnect structure and the same as device E.
(16) G is either positioned at node N(r+1, è, $h_T(z)$) or is outside the interconnect structure.

Note that the terms è+1 and è−1 refer to addition and subtraction, respectively, modulus K.

In this notation, (è−1)mod K is equal K when è is equal to 0 and equal to è−1 otherwise. The conversion of z to $H_r(z)$ on a level r is described for $z=[z_{J-1}, z_{J-}, \ldots, z_r, z_{r-1}, \ldots, z_2, z_1, z_0]$ by reversing the order of low-order z bits from $z_{r-1}$ to $z_0$] into the form $z=[z_{J-1}, z_{J-2}, \ldots, z_r, z_0, z_1, z_2, \ldots, z_{r-1}]$, subtracting one (modulus $2^r$) and reversing back the low-order z bits. Similarly, (è+1)mod K is equal 0 when è is equal to K−1 and equal to è+1 otherwise. The conversion of z to $h_r(z)$ on a level r is described for $z=[z_{J-}, z_{J-2}, \ldots, z_r, z_{r-1}, \ldots, z_2, z_1, z_0]$ by reversing the order of low-order z bits from $z_{r-1}$ to $z_0$] into the form $z=[z_{J-1}, z_{J-2}, \ldots, z_r, z_0, z_1, z_2, \ldots, z_{r-1}]$, adding one (modulus $2^r$) and reversing back the low-order z bits.

Figure 4:
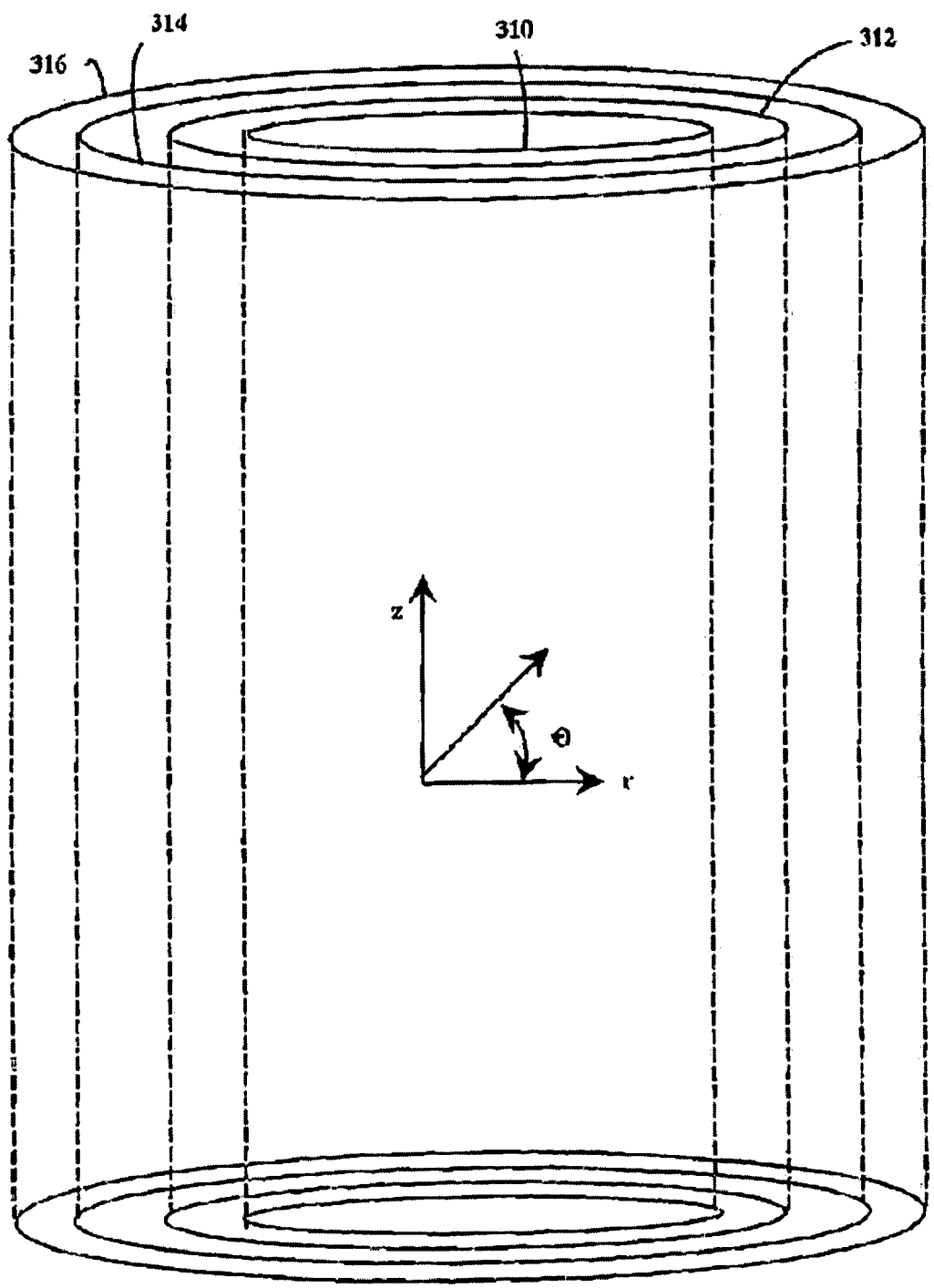
FIG. 4 is an abstract schematic pictorial diagram showing the topology of levels of an interconnect structure.

Referring to FIG. 4, concentric cylindrical levels zero 310, one 312, two 314 and three 316 are shown for a J=3 interconnect structure 300 where level 0 refers to the innermost cylindrical level, progressing outward and numerically to the outermost cylindrical level 3. A node 102 on a level T is called a level T node.

Figure 5:
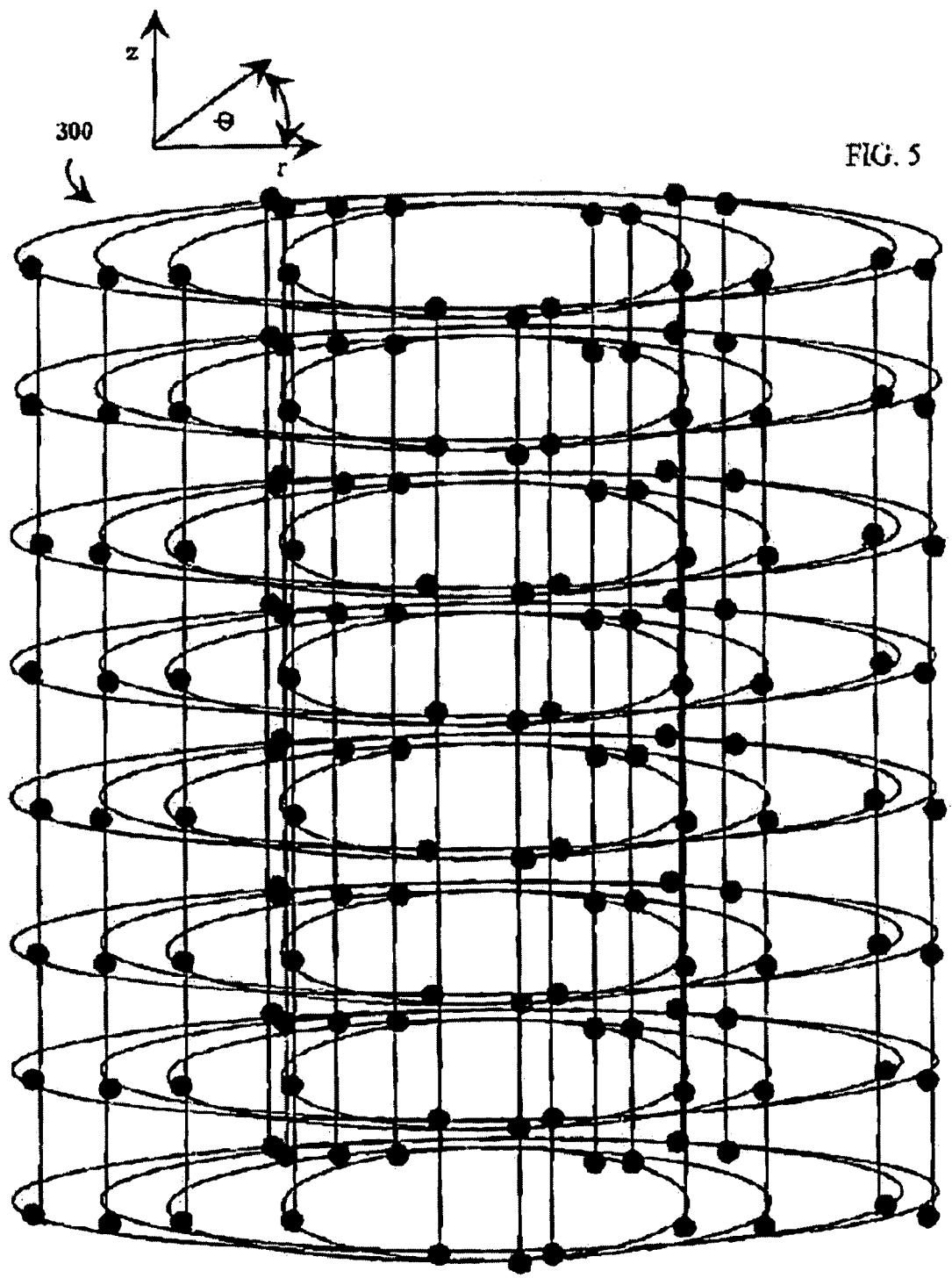
FIG. 5 is an abstract schematic pictorial diagram showing the topology of nodes of an interconnect structure.

An interconnect structure has J+1 levels and $2^J K$ nodes on each level. Referring to FIG. 5, the design parameter K is set equal to 5 so that the interconnect structure 300 has four levels (J+1=3+1=4) with 40 ($2^J K=(2^3)5=40$) nodes on each level.

Referring to FIGS. 6 through 10, the notation is modified, and made more concise, so that a letter at a node location (r,è,z) is denoted as the letter followed by the location designation. For example, node A at location (r,è,z) is designated node A(r,è,z).

Figure 6:
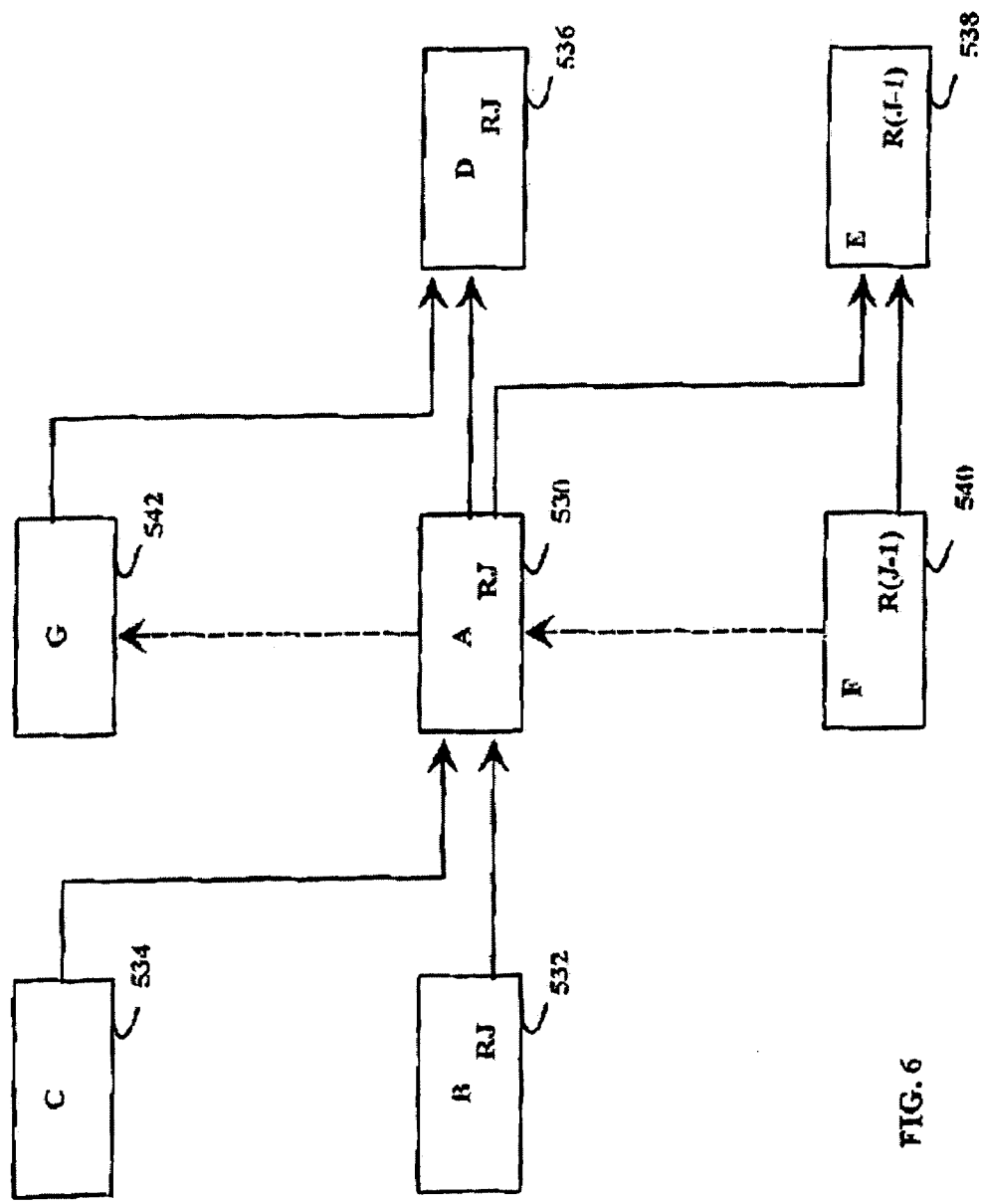
FIG. 6 is an abstract schematic pictorial diagram which illustrates the manner in which nodes of the rings on a particular cylindrical level are interconnected.

Referring to FIG. 6, the interconnect structure is fully defined by designating the interconnections for each node A 530 of each level T to devices or nodes B 532, C 534, D 536, E 538, F 540 and G 542.

Node A(r,è,z) 530 is interconnected with an immediate predecessor node B(r,(è−1)mod K, $H_r(z)$) 532 on level r. If node A(r,è,z) 530 is on the outermost level r=J, node A(r,è,z) 530 is interconnected with a device (e.g. a computational unit of a computer) outside of the interconnect structure. Otherwise, node A(r,è,z) 530 is interconnected with a predecessor node C(r+1, (è−1)mod K,z) 534 on level r+1.

Node A(r,è,z) 530 is interconnected with an immediate successor node D(r, (è+1)mod K,$h_r(z)$) 536 on level r. If node A(r,è,z) 530 is on the innermost level r=0, node A(r,è,z) 530 is interconnected with a device (e.g. a computational unit) outside of the interconnect structure. Otherwise, node A(r,è,z) 530 is interconnected with a successor node E(r−1, (è+1)mod K,z) 538 on level r−1 to send message data.

If node A(r,è,z) 530 is on the innermost level r=0, node A(r,è,z) 530 is interconnected with a device (e.g. a computational unit) outside of the interconnect structure. Otherwise, node A(r,è,z) 530 is interconnected with a node F(r−1,è,$H_r(z)$) 540 on level r−1 which supplies a control input signal to node A(r,è,z) 530.

If node A(r,θ,z) 530 is on the outermost level r=J, node A(r,θ, z) 530 is interconnected with a device (e.g. a computational unit) outside of the interconnect structure. Otherwise, node A(r,θ,z) 530 is interconnected with a node G(r+1,θ,$h_r(z)$) 542 on level r+1 which receives a control input signal from node A(r,θ,z) 530.

Specifically, the interconnections of a node A for the example of an interconnect structure with interconnect design parameters J=3 and K=5 are defined for all nodes on a ring. Every ring is unidirectional and forms a closed curve so that the entire structure is defined by designating for each node A, a node D that receives data from node A.

Figure 7:
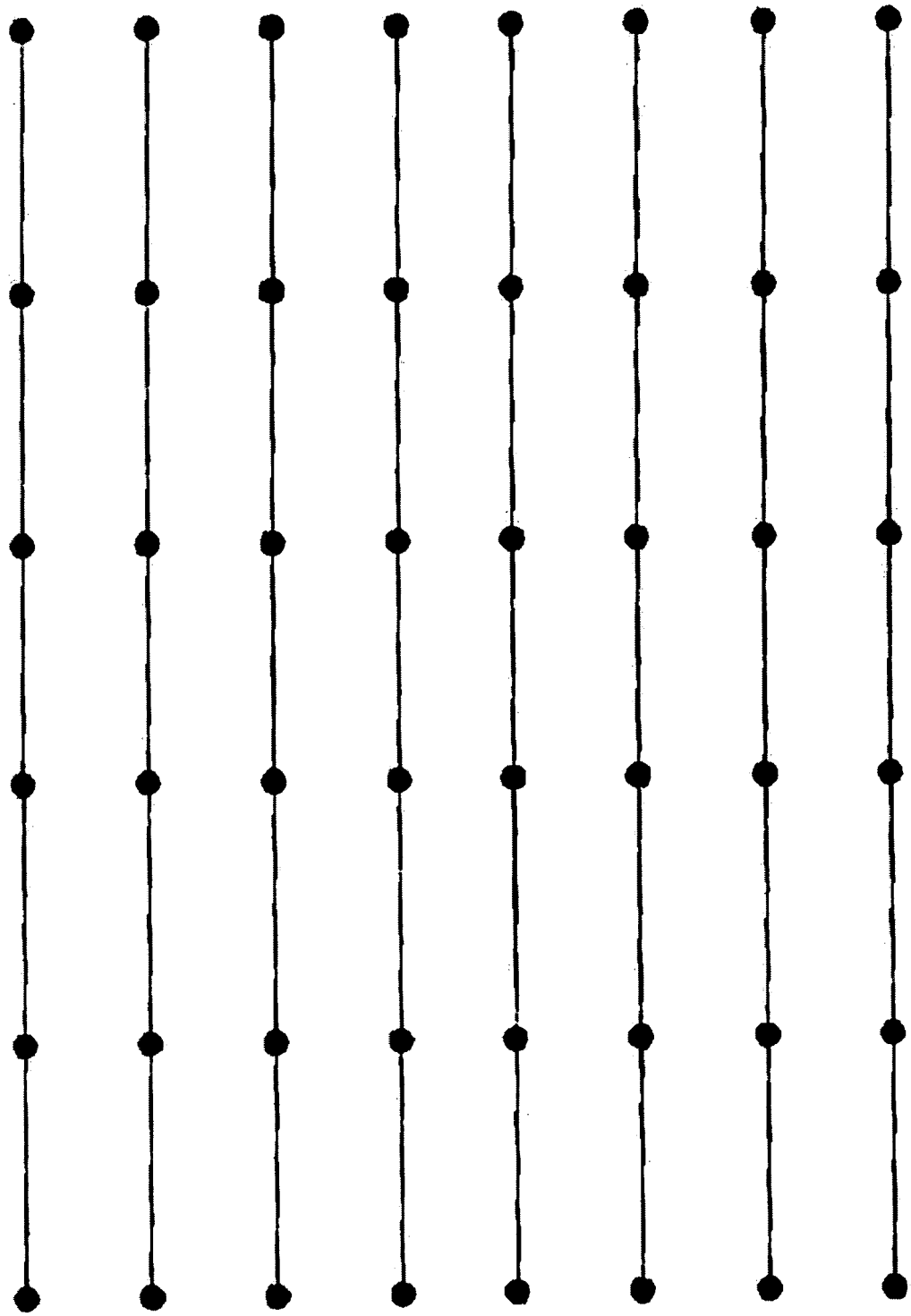
FIG. 7 illustrates interconnections of a node on level zero.

Referring to FIG. 7 in conjunction with FIG. 3C, interconnections of a node A on level zero are shown. Node A(0,è,z) 360 is interconnected to receive message data from immediate predecessor node B(0, (è−1)mod 5,z) 362 on level 0 and to send message data to immediate successor node D(0, (è+1) mod 5,z) 366 on level 0. Although the interconnection term in the second dimension for nodes B and D is previously defined as $H_r(z)$ and $h_r(z)$, respectively, on level zero, $H_r(z)=H_0(z)=z$ and $h_r(z)=h_0(z)=z$. Node A(0,è,z) 360 is also interconnected to receive message data from predecessor node C(1, (è−1) mod 5,z) 364 on level 1 and to send message data to a device E(è,z) 368. Node A(0,è,z) 360 is interconnected to receive control information from the device E(è, z) 368 outside the network and to send a control output signal to node G(1,è,h$_0$(z)) 372 on level 1.

Figure 8:
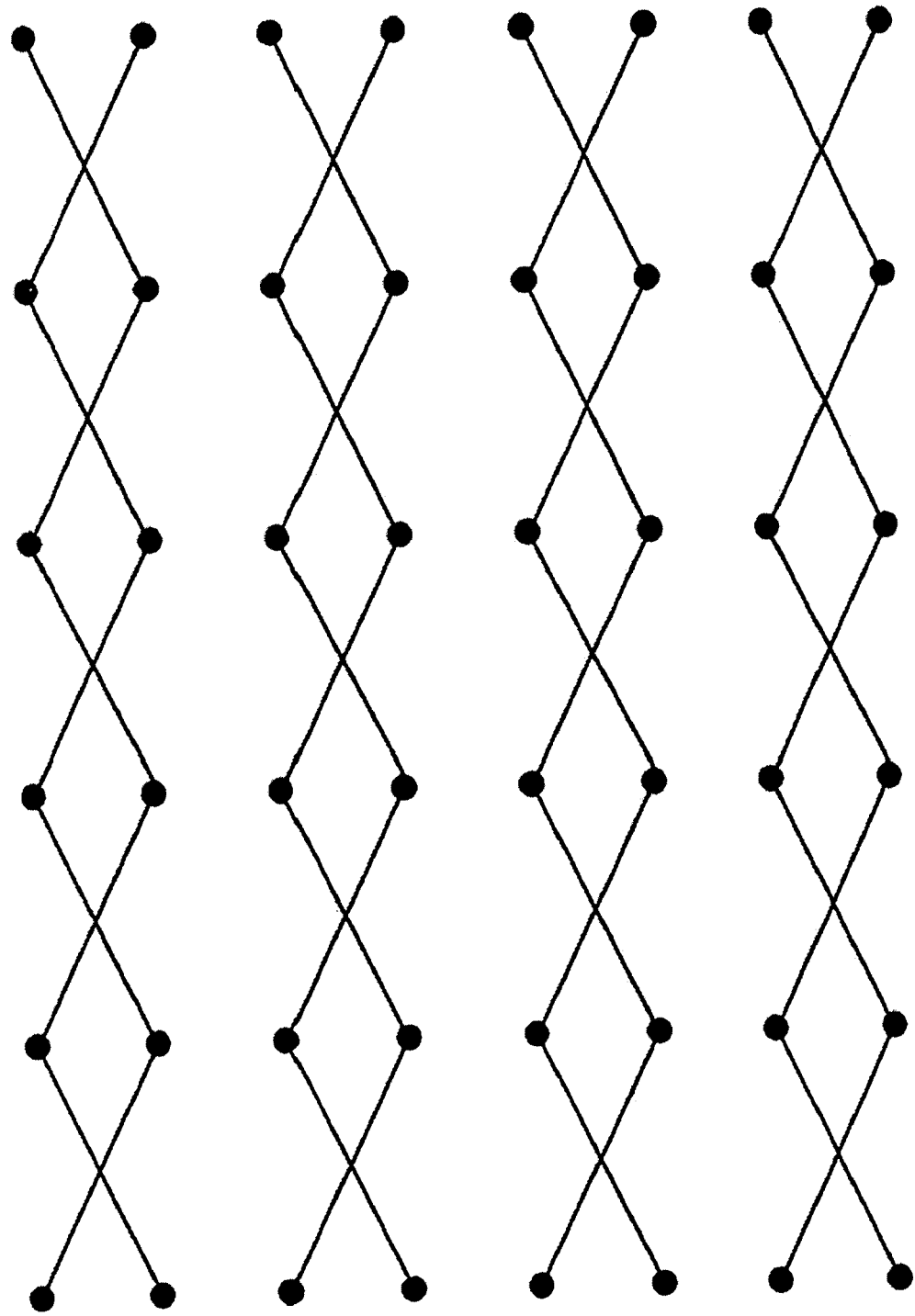
FIG. 8 depicts interconnections of a node on level one.

Referring to FIG. 8 in conjunction with FIG. 6, interconnections of a node A on level one are shown. Node A(1,è,z) 530 is interconnected to receive message data from immediate predecessor node B(1, (è−1)mod 5, H$_1$(z)) 532 on level 1 and to send message data to immediate successor node D(1, (è+1)mod 5,h$_1$(z)) 536 on level 1. Height z is expressed as a binary number (base 2) having the form [z$_2$,z$_1$,z$_0$]. For level one, when z is [z$_2$,z$_1$,0] then h$_1$(z) and H$_1$(z) are both [z$_2$,z$_1$,1]. When z is [z$_2$,z$_1$,1] then h$_1$(z) and H$_1$(z) are both [z$_2$,z$_1$,0]. Node A(1,è,z) 530 is also interconnected to receive message data from predecessor node C(2, (è−1)mod 5,z) 534 on level 2 and to send message data to successor node E(0, (è+1)mod 5,z) 538 on level 0. Node A(1,è,z) 530 is interconnected to receive a control input signal from a node F(0,è,H$_0$(z)) 540 on level zero and to send a control output signal to node G(2,è,h$_1$(z)) 542 on level 2.

Figure 9:
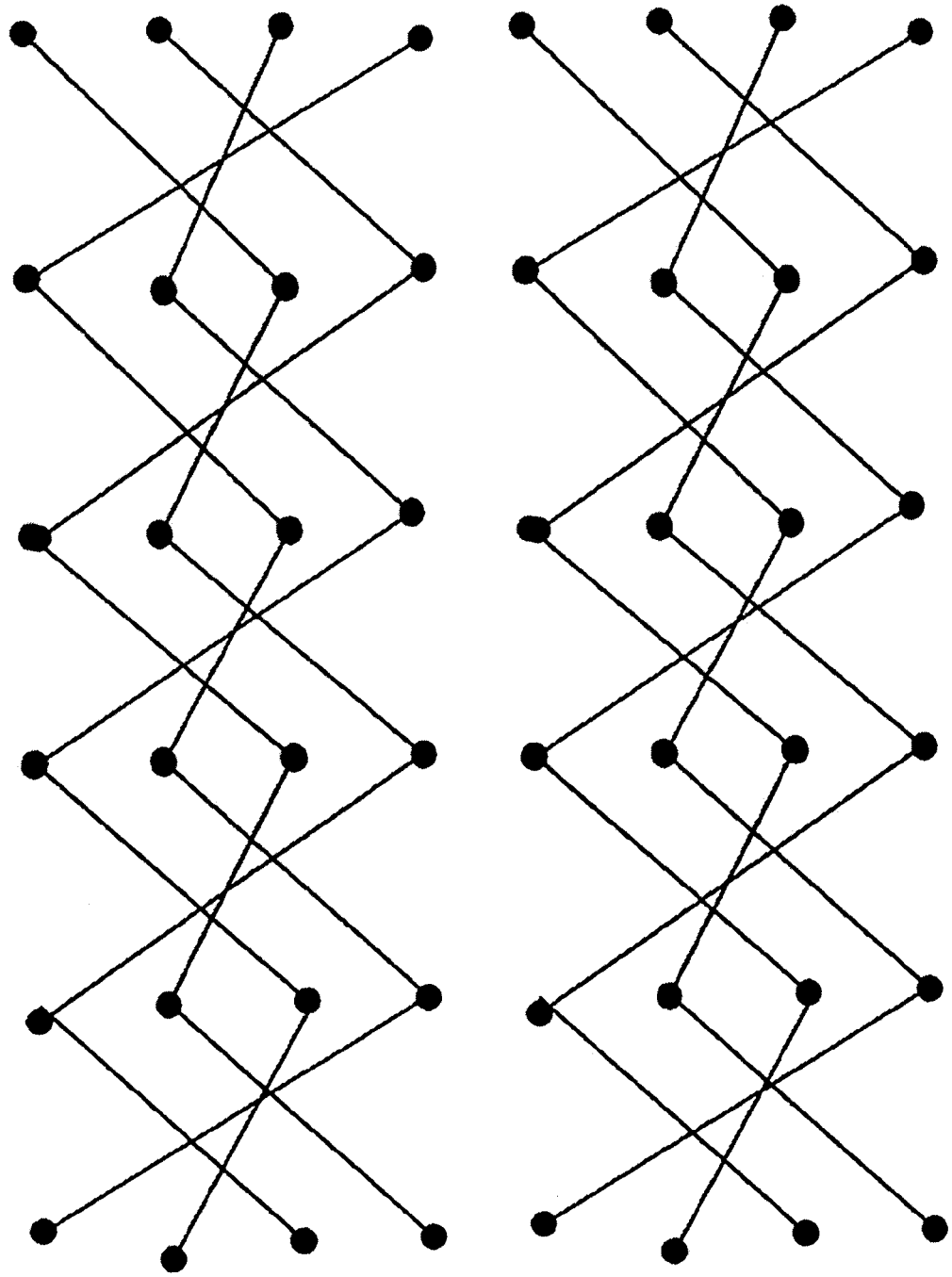
FIG. 9 depicts interconnections of a node on level two.

Referring to FIG. 9 in conjunction with FIG. 6, interconnections of a node A on level two are shown. Node A(2,è,z) 530 is interconnected to receive message data from immediate predecessor node B(2, (è−1)mod 5,H$_2$(z)) 532 on level 2 and to send message data to immediate successor node D(2, (è+1)mod 5,h$_2$(z)) 536 on level 2. Height z is expressed as a binary number (base 2) having the form [z$_2$,z$_1$,z$_0$]. For level two, when z is [z$_2$,0,0] then h$_2$(z) is [z$_2$,1,0] and H$_2$(z) is [z$_2$,1,1]. When z is [z$_2$,0,1] then h$_2$(z) is [z$_2$,1,1] and H$_2$(z) is [z$_2$,1,0]. When z is [z$_2$,1,0] then h$_2$(z) is [z$_2$,0,1] and H$_2$(z) is [z$_2$,0,0]. When z is [z$_2$,1,1] then h$_2$(z) is [z$_2$,0,0] and H$_2$(z) is [z$_2$,0,1]. Node A(2,è,z) 530 is also interconnected to receive message data from predecessor node C(3, (è−1)mod 5,z) 534 on level 3 and to send message data to successor node E(1, (è+1)mod 5,z) 538 on level 1. Node A(2,è,z) 530 is interconnected to receive a control input signal from a node F(1,è,H$_1$(z)) 540 on level 1 and to send a control output signal to node G(3,è,h$_2$(z)) 542 on level 3.

Figure 10:
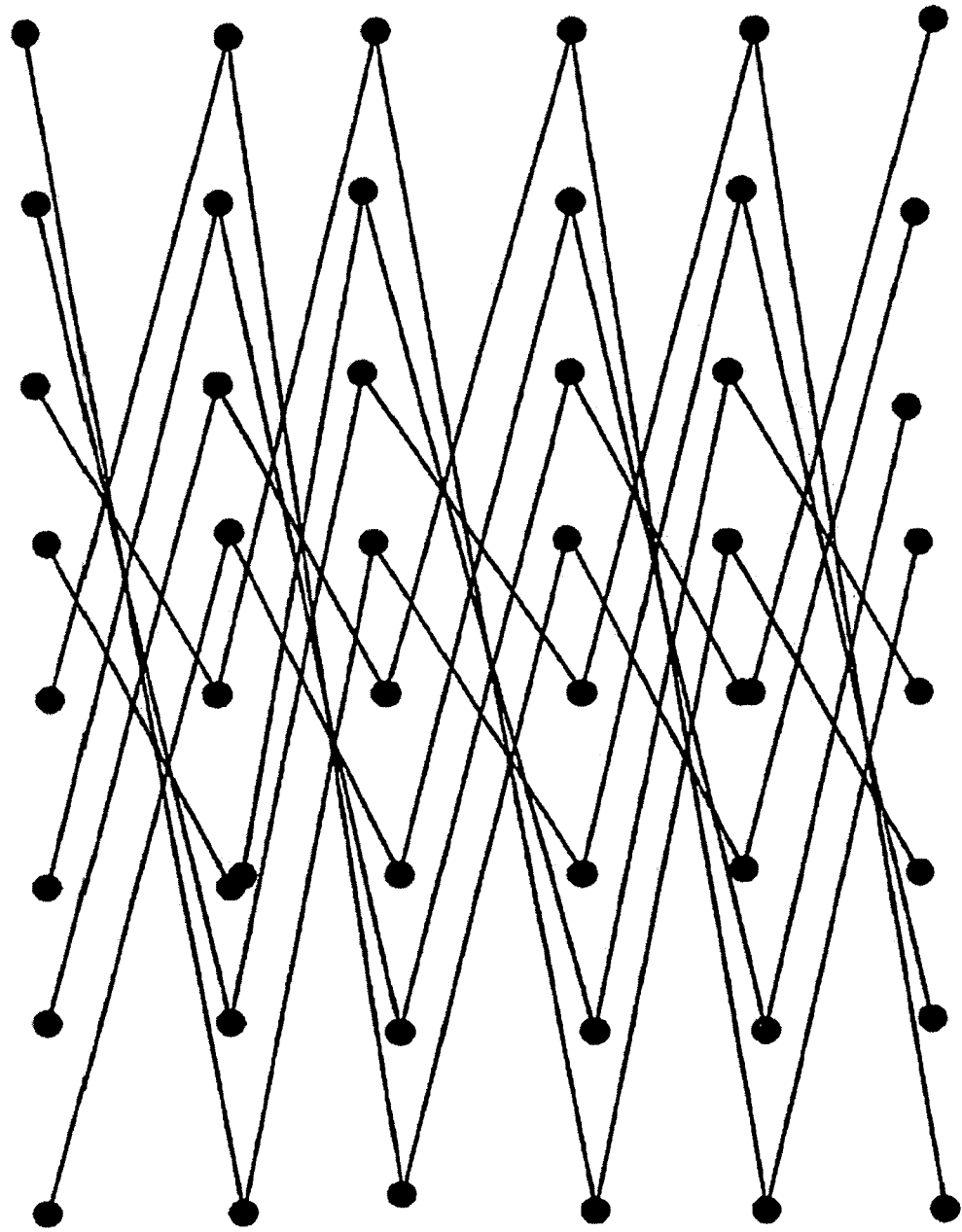
FIG. 10 depicts interconnections of a node on level three.

Referring to FIG. 10 in conjunction with FIG. 6, interconnections of a node A on level three of an interconnect structure with J>3 and K=5 are shown. Node A(3,è,z) 530 is interconnected to receive message data from immediate predecessor node B(3, (è−1)mod 5,H$_3$(z)) 532 on level 3 and to send message data to immediate successor node D(3, (è+1)mod 5,h$_3$(z)) 536 on level 3. For level three, when z is [0,0,0] then h$_3$(z) is [1,0,0] and H$_3$(z) is [1,1,1]. When z is [0,0,1] then h$_3$(z) is [1,0,1] and H$_3$(z) is [1,1,0]. When z is [0,1,0] then h$_3$(z) is [1,1,0] and H$_3$(z) is [1,0,0]. When z is [0,1,1] then h$_3$(z) is [1,1,1] and H$_3$(z) is [1,0,1]. When z is [1,0,0] then h$_3$(z) is [0,1,0] and H$_3$(z) is [0,0,0]. When z is [1,0,1] then h$_3$(z) is [0,1,1] and H$_3$(z) is [0,0,1]. When z is [1,1,0] then h$_3$(z) is [0,0,1] and H$_3$(z) is [0,1,0]. When z is [1,1,1] then h$_3$(z) is [0,0,0] and H$_3$(z) is [0,1,1]. Node A(3,è,z) 530 is also interconnected to receive message data from predecessor node C(4, (è−1)mod 5,z) 534 on level 4 and to send message data to successor node E(2, (è+1)mod 5,z) 538 on level 2. Node A(3,è,z) 530 is interconnected to receive a control input signal from a node F(2,è,H$_2$(z)) 540 on level 2 and to send a control output signal to node G(4,è,h$_3$(z)) 542 on level 4.

Figure 11:
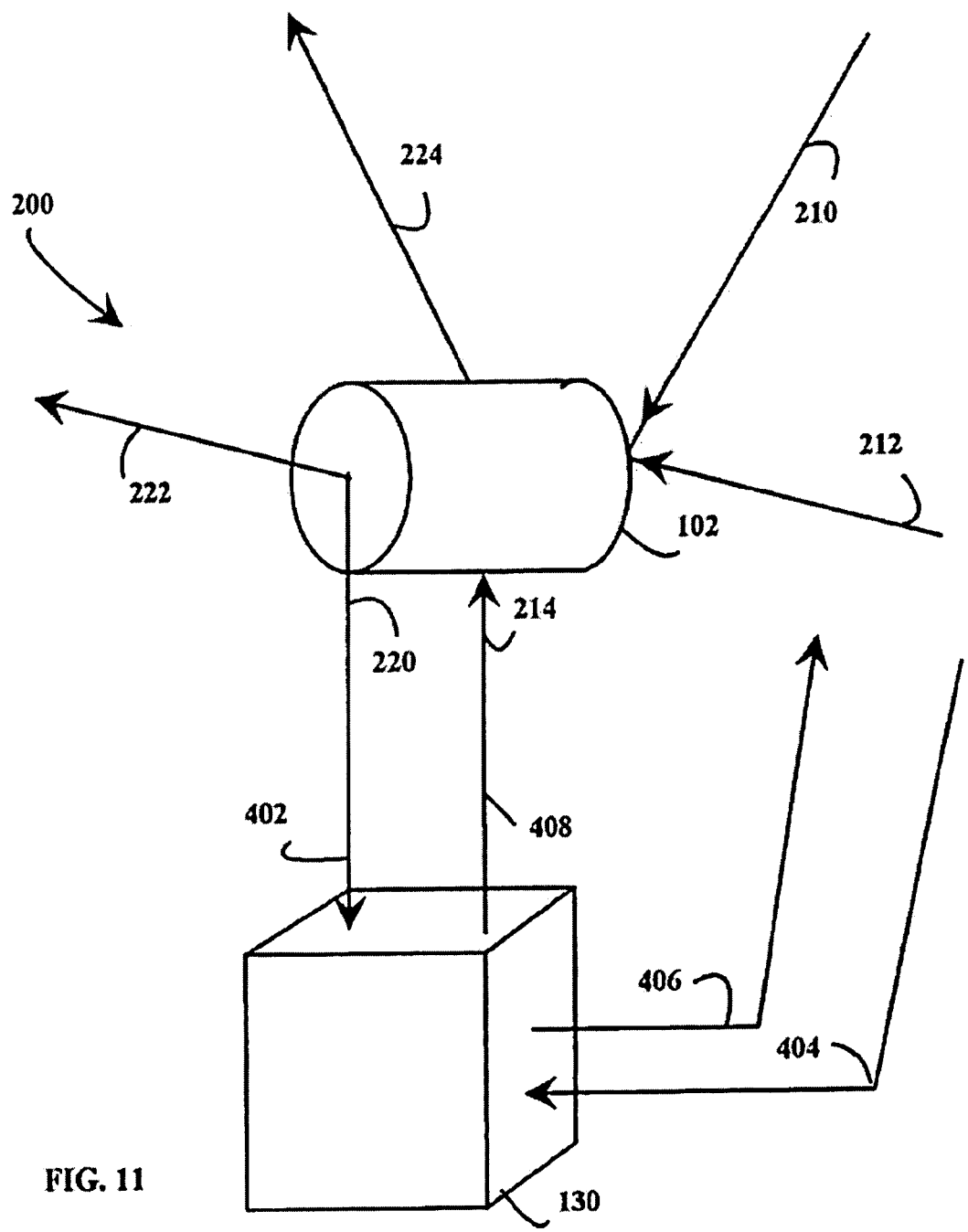
FIG. 11 is an abstract schematic pictorial diagram which illustrates interconnections between devices and nodes of a ring on the low level cylinder.

FIG. 11 illustrates interconnections between devices 130 and nodes 102 of a ring 120 on the cylindrical level zero 110. In accordance with the description of the interconnect structure 200 of a node 102 discussed with respect to FIG. 2, a node 102 has three input terminals and three output terminals, including two data input terminals and one control input terminal and two data output terminals and one control output terminal. In a simple embodiment, a device 130 has one data input terminal 402, one control bit input terminal 404, one data output terminal 406 and one control bit output terminal 408.

Referring to FIG. 11, nodes 102 at the lowest cylindrical level 110, specifically nodes N(0,è,z), are connected to devices CU(è,z). In particular, the data input terminal 402 of devices CU(è,z) are connected to the second data output terminal 222 of nodes N(0,è,z). The control bit output terminal 408 of devices CU(è,z) are connected to the control input terminal 214 of nodes N(0,è,z).

The devices CU(θ,z) are also connected to nodes N(J,θ,z) at the outermost cylinder level. In particular, the data output terminal 406 of devices CU(è,z) are connected to the second data input terminal 212 of nodes N(J,θ,z). The control bit input terminal 404 of devices CU(θ,z) are connected to the control output terminal 224 of nodes N(J,θ−1,$_r$(z)). Messages are communicated from devices CU(θ,z) to nodes N(J,θ,z) at the outermost cylindrical level J. Then messages move sequentially inward from the outermost cylindrical level J to level J−1, level J−2 and so forth until the messages reach level 0 and then enter a device. Messages on the outermost cylinder J can reach any of the $2^J$ rings at level zero. Generally, messages on any cylindrical level T can reach a node on $2^T$ rings on level zero.

Figure 12:
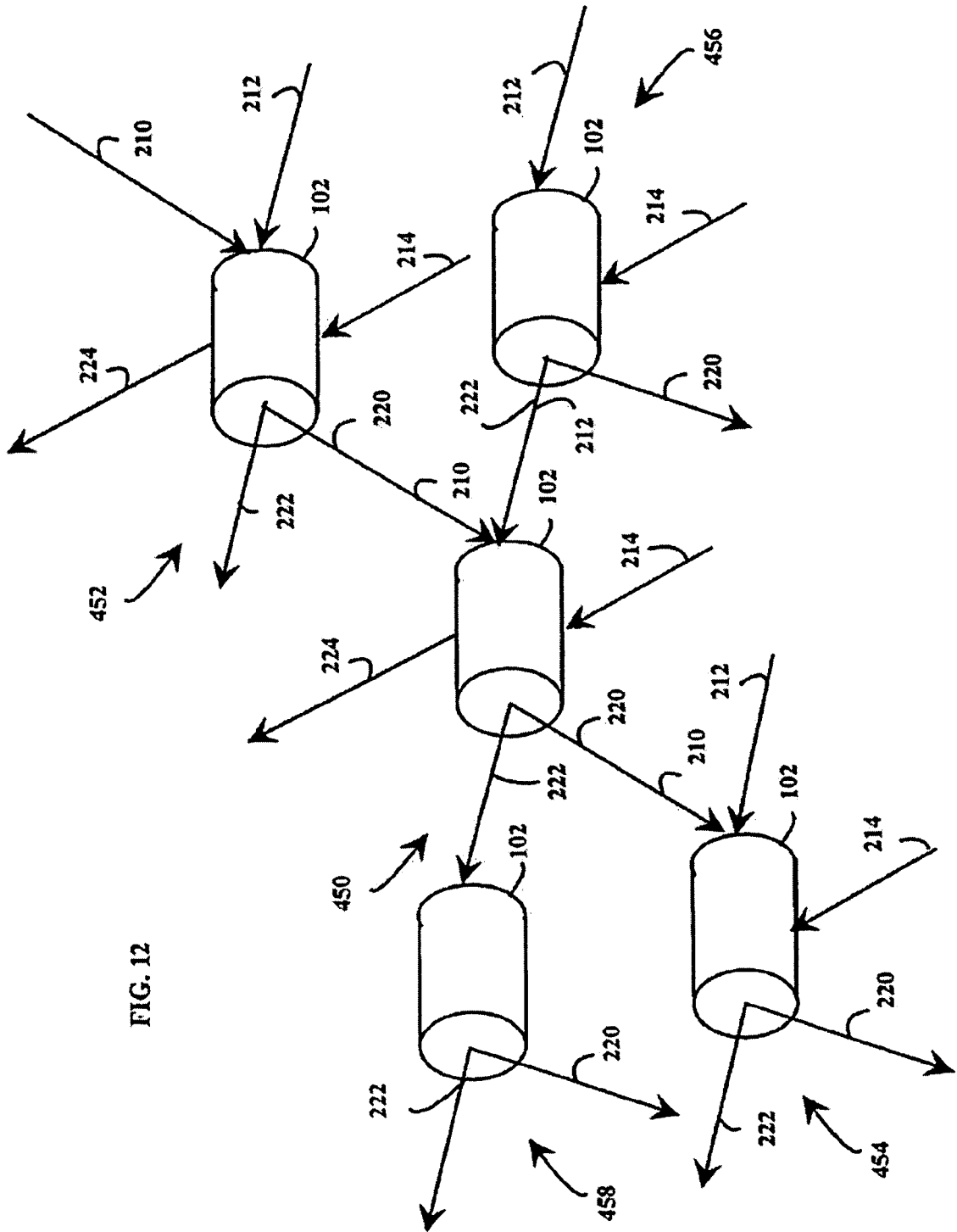
FIG. 12 is an abstract schematic pictorial diagram which illustrates interconnections among nodes of two adjacent cylindrical levels.

FIG. 12 illustrates interconnections among nodes 102 of two adjacent cylindrical levels 110. Referring to FIG. 12 in conjunction with FIG. 2, nodes 102 at the T cylindrical level 110, specifically nodes N(T,è,z) 450, have terminals connected to nodes on the T level, the T+1 level and the T−1 level. These connections are such that the nodes N(T,è,z) 450 have one data input terminal connected to a node on the same level T and one data input terminal connected to another source, usually a node on the next outer level T+1 but for nodes on the outermost level J, a device is a source. In particular, nodes N(T,è,z) 450 have a first data input terminal 210 which is connected to a first data output terminal 220 of nodes N(T+1,è−1,z) 452. Also, nodes N(T,è,z) 450 have a first data output terminal 220 which is connected to a first data input terminal 210 of nodes N(T−1,è+1,z) 454.

The nodes N(Tθ,z) 450 also have a second data input terminal 212 and a second data output terminal 222 which are connected to nodes 102 on the same level T. The second data input terminal 212 of nodes N(T,θ,z) 450 are connected to the second data output terminal 222 of nodes N(T,θ1,H$_r$(z)) 456. The second data output terminal 222 of nodes N(T,θ,z) 450 are connected to the second data input terminal 212 of nodes N(T,θ+1, h$_T$(z)) 458. The cylinder height designation H$_T$z) is determined using an inverse operation of the technique for determining height designation h$_T$(z). The interconnection of nodes from cylindrical height to height (height z to height H$_T$(z) and height h$_T$(z) to height z) on the same level T is precisely defined according to a height transformation technique and depends on the particular level T within which messages are communicated. Specifically in accordance with the height transformation technique, the height position z is put into binary form where $z=z_{J-1}2^{J-1}+z_{J-2}2^{J-2}+ \ldots +z_T2^T+z_{T-1}2^{T-1}+ \ldots +z_12^1+z_02^0$. A next height position h$_T$(z) is determined using a process including three steps. First, binary coefficients starting with coefficient $z_0$, up to and but not including coefficient $z_T$ are reversed in order while coefficients $z_T$ and above are kept the same. Thus, after the first step the height position becomes $z_{J-1}2^{J-1}+z_{J-2}2^{J-2}+ \ldots +z_T2^T+z_02^0+z_12^1+ \ldots +z_{T-2}2^{T-2}+z_{T-1}2^{T-1}$. Second, an odd number modulus $2^T$, for example one, is added to the height position after inversion. Third, circularity of the height position is enforced by limiting the inverted and incremented height position by modulus $2^T$. Fourth, the first step is repeated, again inverting the binary coefficients below the $z^J$ coefficient of the previously inverted, incremented and limited height position. The inverse operation for deriving height descriptor $H_T(z)$ is determined in the same manner except that, rather than adding the odd number modulus $2^T$ to the order-inverted bit string, the same odd number modulus $2^T$ is subtracted from the order-inverted bit string.

The interconnection between nodes 102 on the same level is notable and highly advantageous for many reasons. For example, the interconnection structure resolves contention among messages directed toward the same node. Also, the interconnection structure ensures that a message on a particular level that is blocked by messages on the next level makes a complete tour of the messages on that level before any message is in position to block again. Thus a message inherently moves to cover all possible paths to the next level. Furthermore, a blocking message must cycle through all rings of a level to block a message twice. Consequently, every message is diverted to avoid continuously blocking other messages. In addition, blocking messages typically proceed to subsequent levels so that overlying messages are not blocked for long.

When messages are sent from second data output terminal 222 of a node $N(T,\theta,z)$ 450 to a second data input terminal 212 of a node $N(T,\theta 1,h_T(z))$, a control code is also sent from a control output terminal 224 of the node $N(T,\theta,z)$ 450 to a control input terminal 214 of a node $N(T+1\theta,h_T(z))$, the node on level T+1 that has a data output terminal connected to a data input terminal of node $N(T,\theta+,1,h_T(z))$. This control code prohibits node $N(T+1,\theta,h_T(z))$ from sending a message to node $N(T,\theta+1,h_T(z))$ at the time node $N(T,\theta,z)$ 450 is sending a message to node $N(T,\theta+1,h_T(z))$. When node $N(T+1,\theta,h_T(z))$ is blocked from sending a message to node $N(T\theta+1,h_T(z))$, the message is deflected to a node on level T+1. Thus, messages communicated on the same level have priority over messages communicated from another level.

The second data output terminal 222 of nodes $N(T,\theta-1,H_T(z))$ are connected to a second data input terminal 212 of nodes $N(T,\theta,z)$ 450 so that nodes $N(T,\theta,z)$ 450 receive messages from nodes $N(T,\theta+1,H_T(z))$ that are blocked from transmission to nodes $N(T-1,\theta,H_{T-1}(z))$. Also, the control output terminal 224 of nodes $N(T-1,\theta H_T(z))$ are connected to the control input terminal 214 of nodes $N(T,\theta,z)$ 450 to warn of a blocked node and to inform nodes $N(T,\theta,z)$ 450 not to send data to node $N(T-1,\theta+1,z)$ at this time since no node receives data from two sources at the same time.

Figure 13:
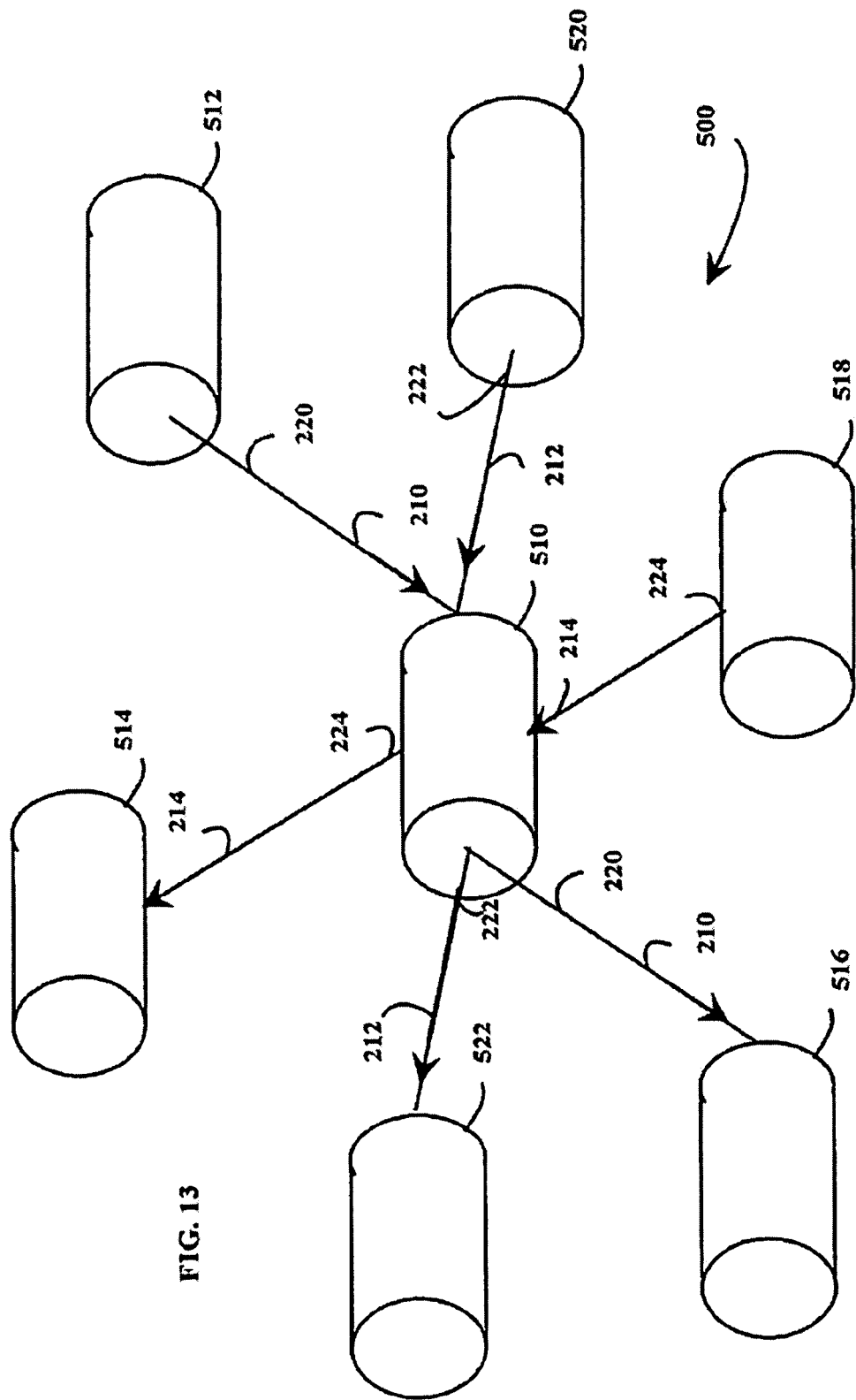
FIG. 13 is an abstract schematic pictorial diagram showing interconnections of nodes on cylindrical level one.

Referring to FIG. 13, interconnections of nodes 102 on cylindrical level one exemplify the described interconnections and demonstrate characteristics and advantages that arise from the general interconnection technique. In this example, the number of nodes K at a cylindrical height is five and the number of heights $2^J$ is $2^2$, or 4, for a three level (J+1) interconnect structure 500. Nodes $N(1,è,z)$ 510 have: (1) a first data input terminal 210 connected to a first data output terminal 220 of nodes $N(2,è-1,z)$ 512, (2) a control output terminal 224 connected to control input terminal 214 of nodes $N(2,è,h_1(z))$ 514, (3) a first data output terminal 220 connected to a first data input terminal 210 of nodes $N(0,è+1,z)$ 516, (4) a control input terminal 214 connected to a control output terminal 224 of nodes $N(0,è,z)$ 518, (5) a second data input terminal 212 connected to the second data output terminal 222 of nodes $N(1,è-1,H_1(z))$ 520, and (6) a second data output terminal 222 connected to the second data input terminal 212 of nodes $N(1,è+1,h_1(z))$ 522. For nodes $N(1,è,z)$ 510 on level one, height z differs from height $h_1(z)$ and height $H_1(z)$ only in the final bit position.

Messages are communicated through the interconnect structure 500 in discrete time steps. A global clock (not shown) generates timing signals in discrete time steps modulus the number of nodes K at a cylindrical height z of a cylindrical level r. When messages traverse the interconnect structure 500 on the same level (for example, level one) because nodes on an inner level are blocked, messages are communicated from node to node in the discrete time steps. For the interconnect structure 500 with an odd number (K=5) of nodes at a cylindrical level, if data traverses level one for 2K time steps, then the message packet visits 2K different nodes. On time step 2K+1, message packets will begin repeating nodes following the sequential order of the first node traversal. Because the global clock generates the discrete time steps integral time modulus K, if a message packet on level one is over the target ring of that packet at a time T and is deflected by a message on level zero, the message will be over the target ring also at a time T+2 (modulus K) to make another attempt to enter the target ring. In various embodiments, this timing characteristic is consistent throughout the interconnect structure so that, if a message packet is in a position to descend to the next level at a time T=0 (modulus K), the packet will once again be in a position to descend at a subsequent time T=0 (modulus K).

Figure 14:
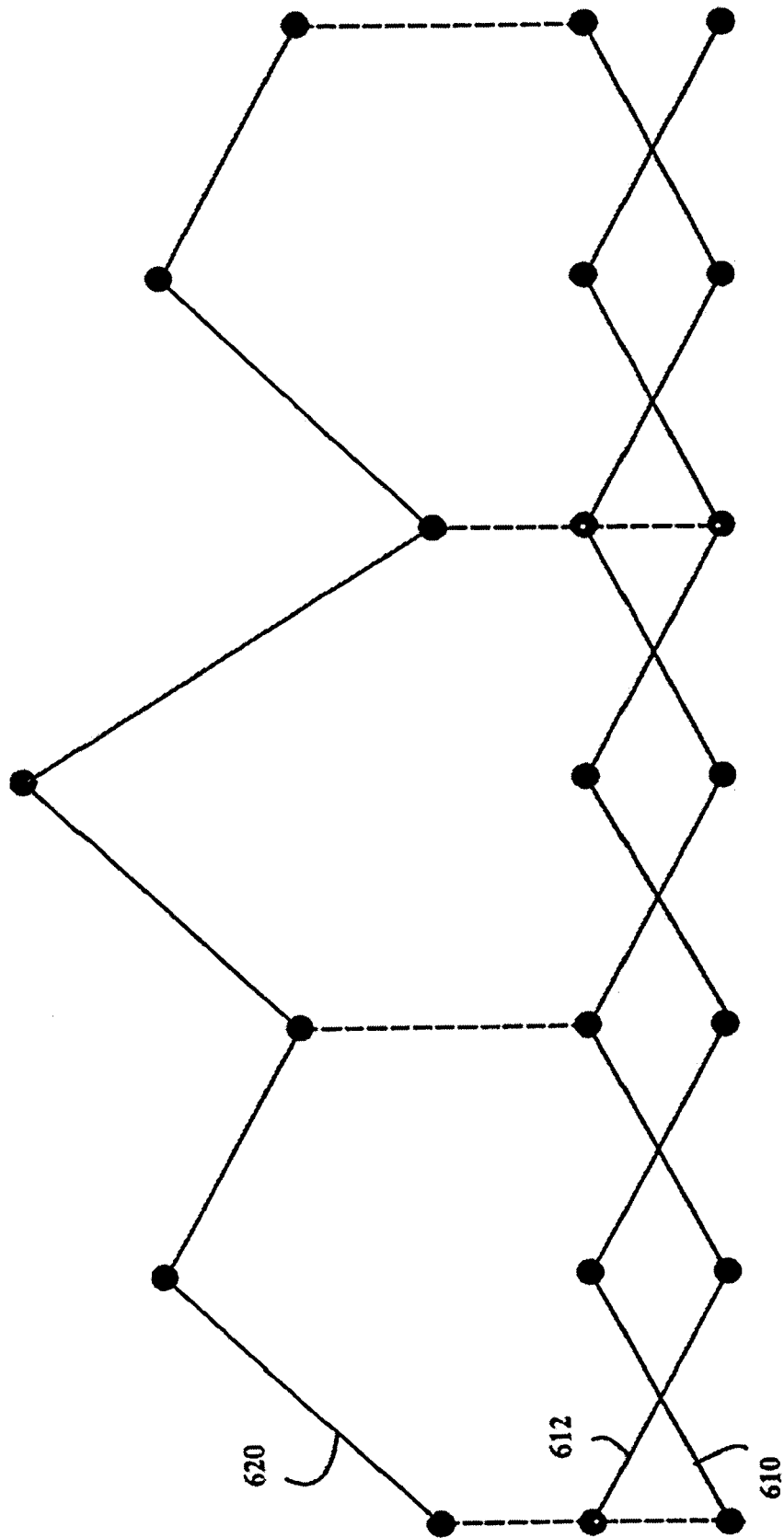
FIG. 14 is an abstract schematic pictorial diagram showing interconnections of nodes on cylindrical level two.

Referring to FIG. 14 in conjunction with FIG. 13, interconnections of nodes 102 on cylindrical level two further exemplify described interconnections. In FIG. 14, a level two message path 620 is shown overlying the paths 610 and 612 of messages moving on level one. The number of angles K at a cylindrical level is five and the number of heights $2^J$ is $2^2$, or 4, for a three level (J1) interconnect structure 500. Same-level interconnections of nodes $N(2,\theta,z)$ include: (1) a second data input terminal 212 connected to the second data output terminal 222 of nodes $N(2,\theta-1,H_2(z))$ and (2) a second data output terminal 222 connected to the second data input terminal 212 of nodes $N(2\theta+1,h_2(z))$. For nodes $N(2,\theta,z)$ on level two, height z differs from height $h_2(z)$ and height $H_2(z)$ only in the final two bit positions. Generally stated in binary form for any suitable number of nodes K at a height and number of heights $2^j$ in a level, z and $z'=h_2(z)$ on cylindrical level two are related as follows:

$[z_{J-1}, z_{J-2}, \ldots, z_2, 0, 0]' = [z_{J-1}, z_{J-2}, \ldots, z_2, 1, 0]$;
$[z_{J-1}, z_{J-2}, \ldots, z_2, 1, 0]' = [z_{J-1}, z_{J-2}, \ldots, z_2, 0, 1]$;
$[z_{J-1}, z_{J-2}, \ldots, z_2, 0, 1]' = [z_{J-1}, z_{J-2}, \ldots, z_2, 1, 1]$; and
$[z_{J-1}, z_{J-2}, \ldots, z_2, 1, 1]' = [z_{J-1}, z_{J-2}, \ldots, z_2, 0, 0]$.

A second advantage of this interconnection technique for nodes on the same level is that blocked messages are directed to avoid subsequent blocking. FIG. 14 illustrates a message blocking condition and its resolution. On level one, a message $m_o$ 610 is shown at node $N_{rèz}=N_{100}$ and a message $m_1$ 612 at node $N_{101}$. A message M 620 on level two at node $N_{200}$ is targeted for ring zero. At a time zero, message M 620 is blocked and deflected by message $m_1$ 612 to node $N_{212}$ at time one. Assuming that messages $m_0$ and $m_1$ are also deflected and traversing level one, at a time one message $m_0$ 610 is at node $N_{111}$ and message $m_1$ 612 at node $N_{110}$. At a time two, message M 620 moves to node $N_{221}$, message $m_0$ 610 to node $N_{120}$ and message $m_1$ 612 to node $N_{121}$. Thus, at time two, message M 620 is deflected by message $m_0$ 610. At time four, message M 620 is again blocked by message $m_1$ 612. This alternating blocking of message M 620 by messages $m_0$ 610 and $m_1$ 612 continues indefinitely as long as messages $m_0$ 610 and $m_1$ 612 are also blocked. This characteristic is pervasive throughout the interconnect structure so that a single message on an inner level cannot continue to block a message on an outer level. Because a single message packet cannot block another packet and blocking packets continually proceed through the levels, blocking does not persist.

Figure 15:
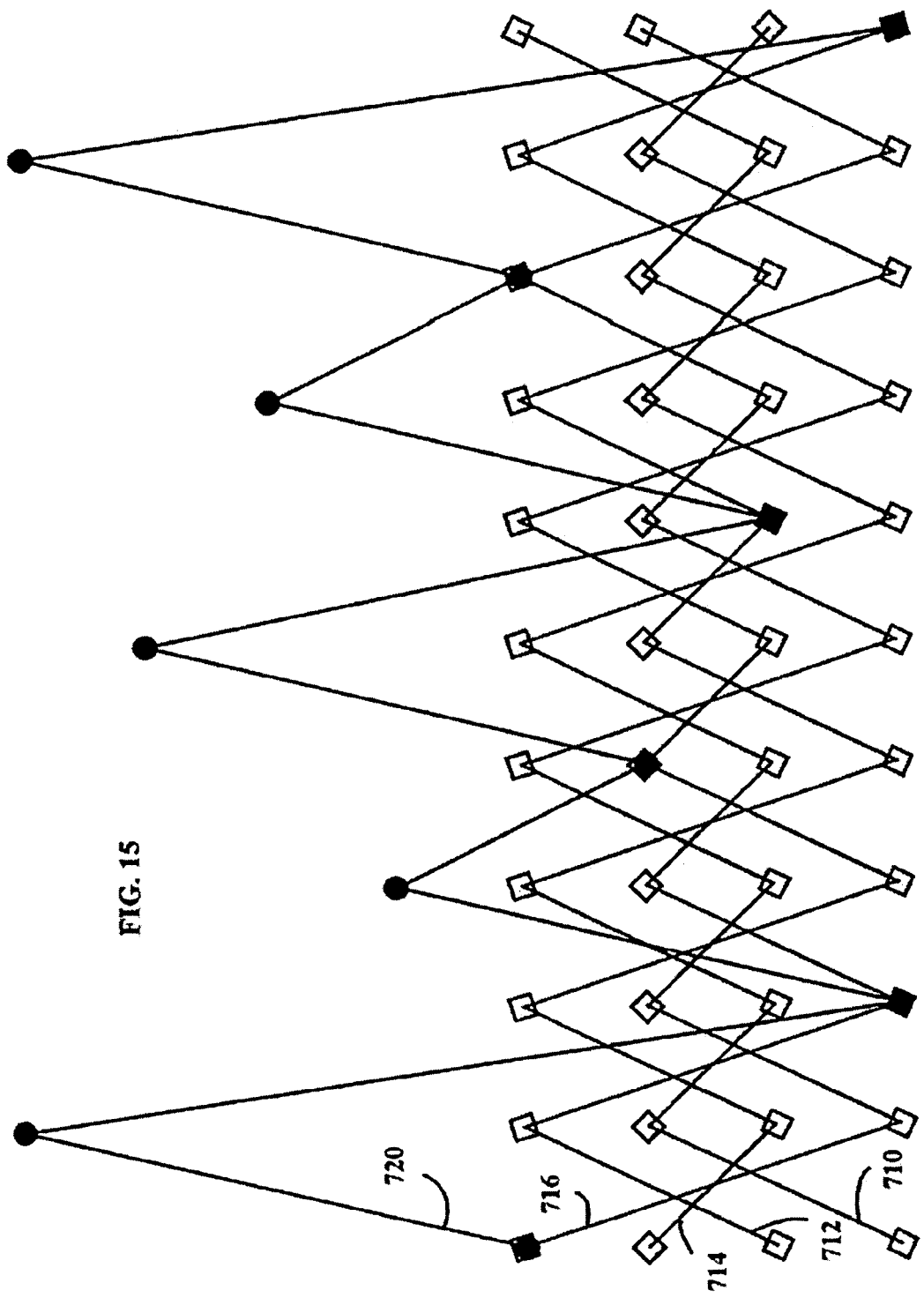
FIG. 15 is an abstract schematic pictorial diagram showing interconnections of nodes on cylindrical level three.

Referring to FIG. 15, interconnections of nodes 102 on cylindrical level three show additional examples of previously described interconnections. A level three message path 720 is shown overlying the paths 710, 712, 714, and 716 of messages moving on level two. The number of nodes K at a cylindrical height is seven and the number of heights $2^J$ is $^3$(8), for a four level (J+1) interconnect structure. Same-level interconnections of nodes N(3,θ,z) include: (1) a second data input terminal 212 connected to the second data output terminal 222 of nodes N(3,θ−1) H₃(z)) and (2) a second data output terminal 222 connected to the second data input terminal 212 of nodes N(3 ,θ+1,h₃(z)). For nodes N(3,θ,z) on level three, height z differs from height $h_3(z)$ and height $H_3(z)$ only in the final three bit positions. Generally stated in binary form for any suitable number of nodes K at a cylindrical height and number of heights $2^J$ in a level, bits z and $z'=h_{3,}(z)$ on cylindrical level three are related as follows:

$[z_{J-1}, z_{J-2}, \ldots, z_3, 0, 0, 0]'=[z_{J-1}, z_{J-2}, \ldots, z_3, 1, 0, 0];$
$[z_{J-1}, z_{J-2}, \ldots, z_3, 1, 0, 0]'=[z_{J-1}, z_{J-2}, \ldots, z_3, 0, 1, 0];$
$[z_{J-1}, z_{J-2}, \ldots, z_3, 0, 1, 0]'=[z_{J-1}, z_{J-2}, \ldots, z_3, 1, 1, 0];$
$[z_{J-1}, z_{J-2}, \ldots, z_3, 1, 1, 0]'=[z_{J-1}, z_{J-2}, \ldots, z_3, 0, 0, 1];$
$[z_{J-1}, z_{J-2}, \ldots, z_3, 0, 0, 1]'=[z_{J-1}, z_{J-2}, \ldots, z_3, 1, 0, 1];$
$[z_{J-1}, z_{J-2}, \ldots, z_3, 1, 0, 1]'=[z_{J-1}, z_{J-2}, \ldots, z_3, 0, 1, 1];$
$[z_{J-1}, z_{J-2}, \ldots, z_3, 1, 1, 1]'=[z_{J-1}, z_{J-2}, \ldots, z_3, 0, 1, 1];$ and
$[z_{J-1}, z_{J-2}, \ldots, z_3, 1, 1, 1]'=[z_{J-1}, z_{J-2}, \ldots, z_3, 0, 0, 0].$ FIG. 15 illustrates another example of a message blocking condition and its resolution. On level two, a message $m_0$ 710 is shown at node $N_{200}$, a message $m_1$ 712 at node $N_{201}$, a message $m_2$ 714 at node $N_{202}$ and a message $m_3$ 716 at node $N_{203}$. A message M 720 on level three at node $N_{300}$ is targeted for ring zero. At a time zero, message M 720 is blocked and deflected by message $m_1$ 712 to node $N_{317}$ at time one. Assuming that messages $m_0$, $m_1$, $m_2$ and $m_3$ are also deflected and traversing level two, at a time one message $m_0$ 710 is at node $N_{212}$, message $m_1$ 712 at node $N_{213}$, message $m_2$ 714 at node $N_{211}$ and message $m_3$ 716 at node $N_{210}$. At a time two, message M 720 moves to node $N_{320}$, message $m_0$ 710 to node $N_{221}$, message $m_1$ 712 to node $N_{220}$, message $m_2$ 714 to node $N_{223}$ and message $m_3$ 716 to node $N_{222}$. Thus, at time two, message M 720 is deflected by message $m_2$ 714. At time four, message M 720 is blocked by message $m_0$ 710. At time six, message M 720 is blocked by message $m_3$ 716. At time eight, message M 720 is again blocked by message $m_1$ 712. This alternating blocking of message M 720 by messages $m_0$ 710, $m_1$ 712, $m_2$ 714 and $m_3$ 716 continues indefinitely as long as messages $m_0$ 710, $m_1$ 712, $m_2$ 714 and $m_3$ 716 are also blocked.

This analysis illustrates the facility by which the described interconnect structure avoids blocking at any level. Thus, "hot spots" of congestion in the structure are minimized. This characteristic is maintained at all levels in the structure.

The described interconnect structure provides that every node N(0,è,z) on level zero is accessible by any node N(J,è,z) on outermost level J. However, only half of the nodes N(0,è,z) on level zero are accessible by a node N(J−1,è,z) on the level once removed from the outermost level. Data at a node N(1, è,z) on level one can access any node N(0,è,z) on level zero so long as the binary representation of height z of level one and the binary representation of ring r of level zero differ only in the last bit. Similarly, data at a node N(2,è,z) on level two can access any node N(0,è,z) on level zero so long as the binary representation of height z of level two and the binary representation of ring r of level zero differ only in the last two bits.

A general rule is that, data at a node N(T,è,z) on level T can access any node N(0,è,z) on level zero so long as the binary representation of height z of level T and the binary representation of ring r of level zero differ only in the last T bits. Accordingly, moving from the outermost level J to level J−1 fixes the most significant bit of the address of the target ring. Moving from level J−1 to level J−2 fixes the next most significant bit of the address of the target ring and so forth. At level zero, no bits are left to be fixed so that no header bit is tested and a message is always passed to a device. In some embodiments, an additional header bit is included and tested at a level zero node. This final bit may be used for various purposes, such as for directing message data to a particular buffer of a device when the device accepts the message data. An advantage of including an additional bit in the header and performing a bit test at the final node is that all the nodes at all levels of the interconnect structure operate consistently.

In some embodiments of an interconnect structure, an additional header bit is included in a message packet. This bit indicates that a message packet is being transmitted. Another purpose for such an additional bit in the header is to identify which bit in the header is the control bit.

A message packet moves from a level T to the next inner level T−1 so long as two conditions are met, as follows: (1) the target ring of the message packet is accessible from level T−1, and (2) the message packet is not blocked by a message on the level T−1.

One significant aspect of this structure is that any message packet at a node N(T,è,z) on a level T that can access its target ring can also access the target ring from a node N(T−1,è+1,z) only if the bit T−1 of the address ring is the same as bit T−1 of the target ring. Therefore, analysis of only a single bit yields all information for determining a correct routing decision.

Figure 16:
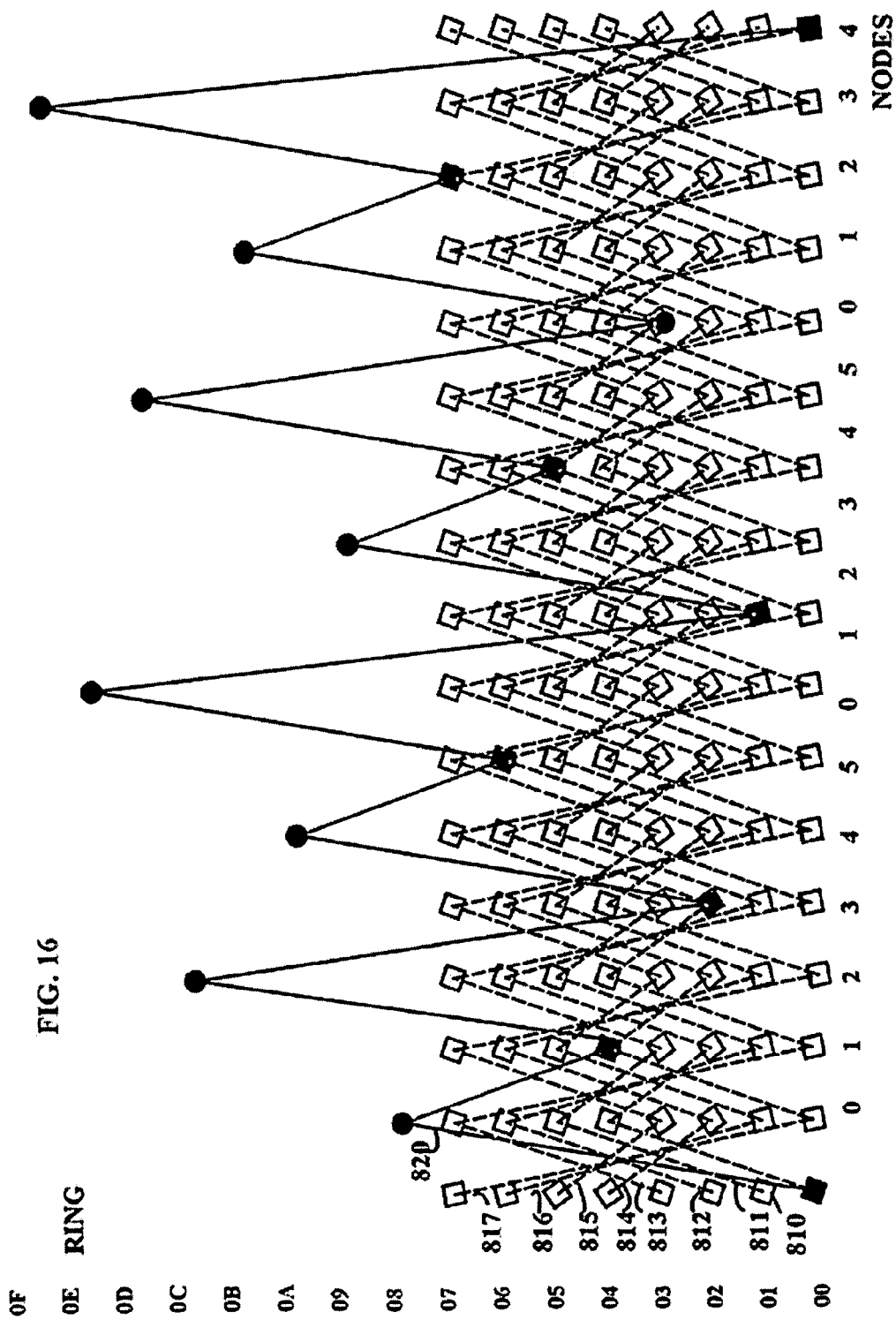
FIG. 16 is an abstract schematic pictorial diagram illustrating the interaction of messages on adjacent levels of an embodiment of the interconnection structure.

Referring to FIG. 16, a general relationship between message packets on two adjacent levels T and T+1 is described. In this example, a message packet M at a node $N_{400}$ on level four, which is targeted for ring two, is potentially blocked by eight message packets $m_0$ 810, $m_1$ 811, $m_2$ 812, $m_3$ 813, $m_4$ 814, $m_5$ 815, $m_6$ 816 and $m_7$ 817 at nodes $N_{30i}$ residing on each of the heights 0 to 7 on level three. Although the behavior of the interconnect structure is analyzed with respect to levels three and four for purposes of illustration, the analysis is applicable to any arbitrary adjacent levels. At an arbitrary time step, illustratively called time step zero, the message M moves from node $N_{400}$ on level four to node $N_{310}$ on level three unless a control code is send to node $N_{400}$ from a level three node having a data output terminal connected to node $N_{310}$. In this example, node $N_{307}$ has a data output terminal connected to node $N_{310}$ and, at time step zero, message $m_1$ resides at node $N_{307}$. Accordingly, node $N_{307}$ sends a control code, in this example a single bit code, to node $N_{400}$, causing deflection of message M to node $N_{418}$ on an interconnection line. At a time step one, message M moves from node $N_{418}$ to node $N_{424}$ on interconnection line regardless of whether a node $N_{428}$ is blocked because ring two is not accessible from node $N_{428}$. At a time step two, message M moves from node $N_{424}$ to node $N_{434}$ unless a control blocking code is sent from node $N_{320}$ to node $N_{424}$ where node $N_{320}$ is the node on level three that has a data output terminal connected to a data input terminal of node $N_{434}$. However, the message M is blocked from accessing node $N_{434}$ because message $m_3$ 813 currently resides at node $N_{320}$. A deflection control code is sent from node $N_{320}$ to node $N_{424}$. Furthermore, assuming that none of the message packets $m_j$ progresses to level two and beyond, at time step four, message M is blocked by message $m_5$ 815 via a control code sent on control bit line. At time six, message M is blocked by message $m_1$ 811 though a blocking control code on control bit line.

This example, illustrates various advantages of the disclosed interconnection structure. First, deflections of the message M completely tour all of the heights on a level T if messages $m_j$ on level T−1 continue to block progression to the level T−1 for all levels T. Accordingly, a message M on a level T is blocked for a complete tour of the heights only if $2^{T-1}$ messages are in position on level T−1 to block message M. In general, a message $m_j$ on a level T−1 must remain on the level T−1 for $2^{T+1}$ time steps to block the same message M on level T twice.

The description exemplifies an interconnect structure in which messages descend from an outer level to devices at a core inner layer by advancing one level when the height dimension matches the destination ring location and traversing the rings when the ring location does not match the height designation. In other embodiments, the messages may move from an inner level to an outer level. In some embodiments, the heights may be traversed as the level changes and the height held constant as the level remains stationary. In these embodiments, the progression of messages through nodes is substantially equivalent to the disclosed interconnect structure. However, the advantage of the disclosed network that avoids blocking of messages is negated.

Figure 17:
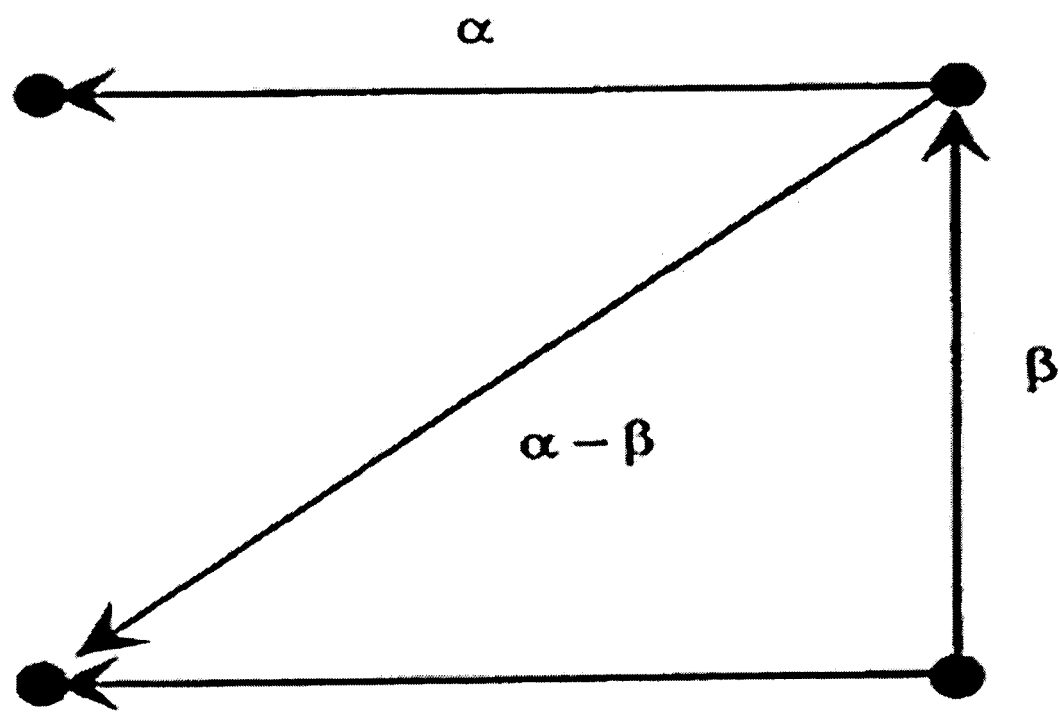
FIG. 17 is a timing diagram which illustrates timing of message communication in the described interconnect structure.
Figure 18:
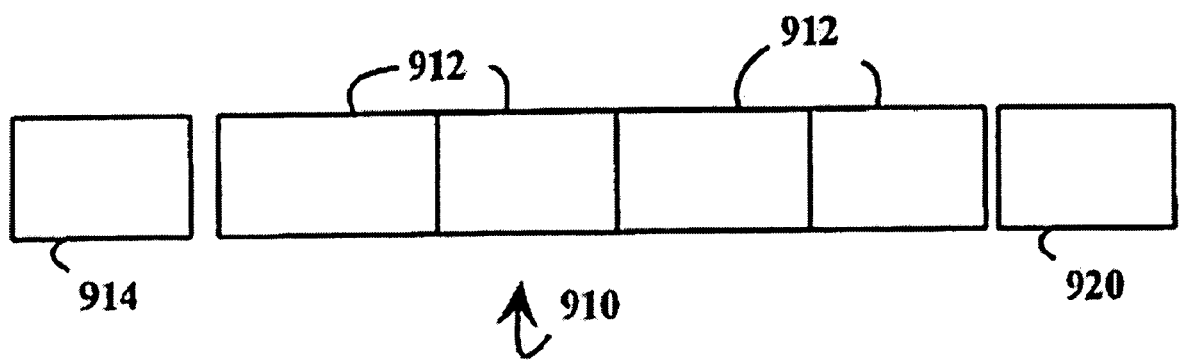
FIG. 18 is a pictorial representation illustrating the format of a message packet including a header and payload.

Referring to FIG. 17, a timing diagram illustrates timing of message communication in the described interconnect structure. In various embodiments of the interconnect structure, control of message communication is determined by timing of message arrival at a node. A message packet, such as a packet 900 shown in FIG. 18, includes a header 910 and a payload 920. The header 910 includes a series of bits 912 designating the target ring in a binary form. When a source device $CU(è_1,z_1)$ at an angle $è_1$ and height $z_1$ sends a message packet M to a destination device $CU(è_2,z_2)$ at an angle $è_2$ and height $z_2$, the bits 912 of header 910 are set to the binary representation of height A global clock servicing an entire interconnect structure keeps integral time modulus K where, again, K designates the number of nodes n at a cylinder height z. There are two constants á and â such that the duration of á exceeds the duration of â and the following five conditions are met. First, the amount of time for a message M to exit a node $N(T,è+1, h_T(z))$ on level T after exiting a node $N(T,è,z)$ also on level T is á. Second, the amount of time for a message M to exit a node $N(T−1,è+1,z)$ on level T−1 after exiting a node $N(T,è,z)$ on level T is á−â. Third, the amount of time for a message to travel from a device CU to a node $N(r,è,z)$ is á−â. Fourth, when a message M moves from a node $N(r,è,z)$ to a node $N(r,è+1,h_r(z))$ in time duration á, the message M also causes a control code to be sent from node $N(r,è,z)$ to a node $N(r+1, è,h_r(z))$ to deflect messages on the outer level r+1. The time that elapses from the time that message M enters node $N(r,è, z)$ until the control bit arrives at node $N(r+1,è,h_{r+1},(z))$ is time duration â. The aforementioned fourth condition also is applicable when a message M moves from a node $N(J,è,z)$ to a node $N(J,è+1,h_j(z))$ at the outermost level J so that the message M also causes a control code to be sent from node $N(J,è,z)$ to the device D outside of the network such that D sends data to $N(J,è+1h_j(z))$. In one embodiment, $D=CU(è+1, h_j(z))$. The time that elapses from the time that message M enters node $N(r,è,z)$ until the control bit arrives at device $CU(è,z)$ is time duration â. Fifth, the global clock generates timing pulses at a rate of á.

When the source device $CU(è_1,z_1)$ sends a message packet M to the destination device $CU(è_2,z_2)$, the message packet M is sent from a data output terminal of device $CU(è,z_1)$ to a data input terminal of node $N(J,è_1,z_1)$ at the outermost level J. Message packets and control bits enter nodes $N(T,è,z)$ on a level T at times having the form ná+Lâ where n is a positive integer. The message M from device $CU(è_1,z_1)$ is sent to the data input terminal of node $N(J,è_1,z_1)$ at a time $t_0$−â and is inserted into the data input terminal of node $N(J,è_1,z_1)$ at time $t_0$ so long as the node $N(J,è_1,z_1)$ is not blocked by a control bit resulting from a message traversing on the level J. Time $t_0$ has the form $(è_2-è_1)á+Jâ$. Similarly, there is a time of the form $(è_2-è_1)á+Jâ$ at which a data input terminal of node $N(J,è_1,z_1)$ is receptive to a message packet from device $CU(è_1,z_1)$.

Nodes $N(T,è,z)$ include logic that controls routing of messages based on the target address of a message packet M and timing signals from other nodes. A first logic switch (not shown) of node $N(T,è,z)$ determines whether the message packet M is to proceed to a node $N(T−1,è+1,z)$ on the next level T−1 or whether the node $N(T−,1,è+1,z)$ is blocked. The first logic switch of node $N(T,è,z)$ is set according to whether a single-bit blocking control code sent from node $N(T−1,è, H_{T-}(z))$ arrives at node $N(T,è,z)$ at a time $t_0$. For example, in some embodiments the first logic switch takes a logic 1 value when a node $N(T−1,è+1,z)$ is blocked and a logic 0 value otherwise. A second logic switch (not shown) of node $N(T,è, z)$ determines whether the message packet M is to proceed to a node $N(T−1,è+1,z)$ on the next level T−1 or whether the node $N(T−1,è+1,z)$ is not in a suitable path for accessing the destination device $CU(è_2,z_2)$ of the header of the message packet M. The header of the message packet M includes the binary representation of destination height $z_2$ $(z_{2(j)}, \ldots z_{2(j-1)}, \ldots, z_{2(1)}, z_{2(0)})$. The node $N(T,è,z)$ on level T includes a single-bit designation $Z_t$ of the height designation z $(z_j, z_{j-1}, \ldots, Z_T, \ldots, Z_1, Z_0)$. In this embodiment, when the first logic switch has a logic 0 valize and the bit designation $z_{2(T)}$ of the destination height is equal to the height designation $z_t$, then the message packet M proceeds to the next level at node $N(T−1,è+1,z)$ and the destination height bit $z_{2(T)}$ is stripped ftom the header of message packet M. Otherwise, the message packet M traverses on the same level T to node $N(T,è+ 1,h_T(z))$. If message packet M proceeds to node $N(T−1,è1,z)$, then message packet M arrives at a time $t_0 +(α−β)$ which is equal to a time $(z_2-z_1+1)α+(J-1) β$. If message packet M traverses to node $N(T,è+1,h_T(z))$, then message packet M arrives at a time $t_0+α$, which is equal to a time $(z_2-z_1+1)Jβ$. As message packet M is sent ftom node $N(r,è,z)$ to node $N(T,è1, h_T(z))$, a single-bit control code is sent to node $N(T+1, è,h_T(z))$ (or device $CU(è,z)$) which arrives at time $t_n+β$. This timing scheme is continued throughout the interconnect structure, maintaining synchrony as message packets are advanced and deflected.

The message packet M reaches level zero at the designated destination height $z_2$. Furthermore, the message packet M reaches the targeted destination device $CU(è_2,z_2)$ at a time zero modulus K (the number of nodes at a height z). If the targeted destination device $CU(è_2,z_2)$ is ready to accept the message packet M, an input port is activated at time zero modulus K to accept the packet. Advantageously, all routing control operations are achieved by comparing two bits, without ever comparing two multiple-bit values. Further advantageously, at the exit point of the interconnect structure as message packets proceed from the nodes to the devices, there is no comparison logic. If a device is prepared to accept a message, the message enters the device via a clock-controlled gate.

Many advantages arise as a consequence of the disclosed timing and interconnect scheme. In an optical implementation, rather than an electronic implementation, of the interconnect structure, signals that encode bits of the header typical have a longer duration than bits that encode the payload. Header bits are extended in duration because, as messages communicate through the interconnect structure, timing becomes slightly skewed. Longer duration header bits allow for accurate reading of the bits even when the message is skewed. In contrast, payload bits encode data that is not read during communication through the interconnect structure. The disclosed timing scheme is advantageous because the number of header bits in a message is greatly reduced. Furthermore, in some embodiments the number of header bits is decremented as bits are used for control purposes at each level then discarded while messages pass from level to level in the interconnect structure. In embodiments that discard a control bit for each level of the interconnect structure, logic at each node is simplified since the control bit at each level is located at the same position throughout the interconnect structure.

That messages communicated on the same level have priority over messages communicated from another level is similarly advantageous because message contention is resolved without carrying priority information in the message header. Message contention is otherwise typically resolved by giving priority to messages that have been in an interconnect structure the longest or to predetermined prioritization. These techniques use information stored in the header to resolve contention.

Although it is advantageous that the interconnect structure and message communication method determines message transmission routing using self-routing decision-making which is local to the nodes and depends on message timing, in some embodiments of the control structure, both local and global communication control is employed. For example, one embodiment of an interconnect structure uses local control which is based on timing to control transmission of message packets in a first transmission mode and alternatively uses global control via a scheduler to administer communication of lengthy strings of message data in a second mode. In the global mode, the usage of a scheduler makes the usage of control bit input and output terminals unnecessary.

One consequence of self-routing of message packets is that the ordering of message packet receipt at a target device may be variable. In some embodiments, the correct order of message segments is ordered by sending ordering information in the message header. Other embodiments employ an optical sorter to order message packets.

Although many advantages are realized through a control structure and communication method which utilizes timing characteristics, rather than control bits in the header, to control message routing, some interconnect node technologies more suitably operate in a routing system utilizing no timing component. Thus in these technologies, instead of introducing a message at predetermined time so that the message arrives at a preset destination at a designated, routing information is contained in additional header bits. Accordingly, a designated target device position is included in header bits, for example bits following the designated target ring position.

In one embodiment, the label of a target device is represented as a single logic one in a string of logic zeros. Thus, when a message arrives at a device N, the device samples the Nth bit of the device element of the header (as distinguished from the ring element) and accepts the message if the Nth bit is a logic one. This technique is highly suitable for optical node implementations.

Nodes

The nodes N(r,è,z) have been described in generic terms to refer to various data communication switches for directing data to alternative data paths. Node structures which are presently available include electronic nodes, optical nodes and mixed optical/electronic nodes. What is claimed include, for example, interconnect and timing methods, an interconnect apparatus and an interconnect topology. These methods and apparati involve nodes in a generic sense. Thus, the scope of the claims is not limited by the particular type of node described herein and is to extend to any node known now or in the future, which performs the function of the nodes described herein.

Figure 19:
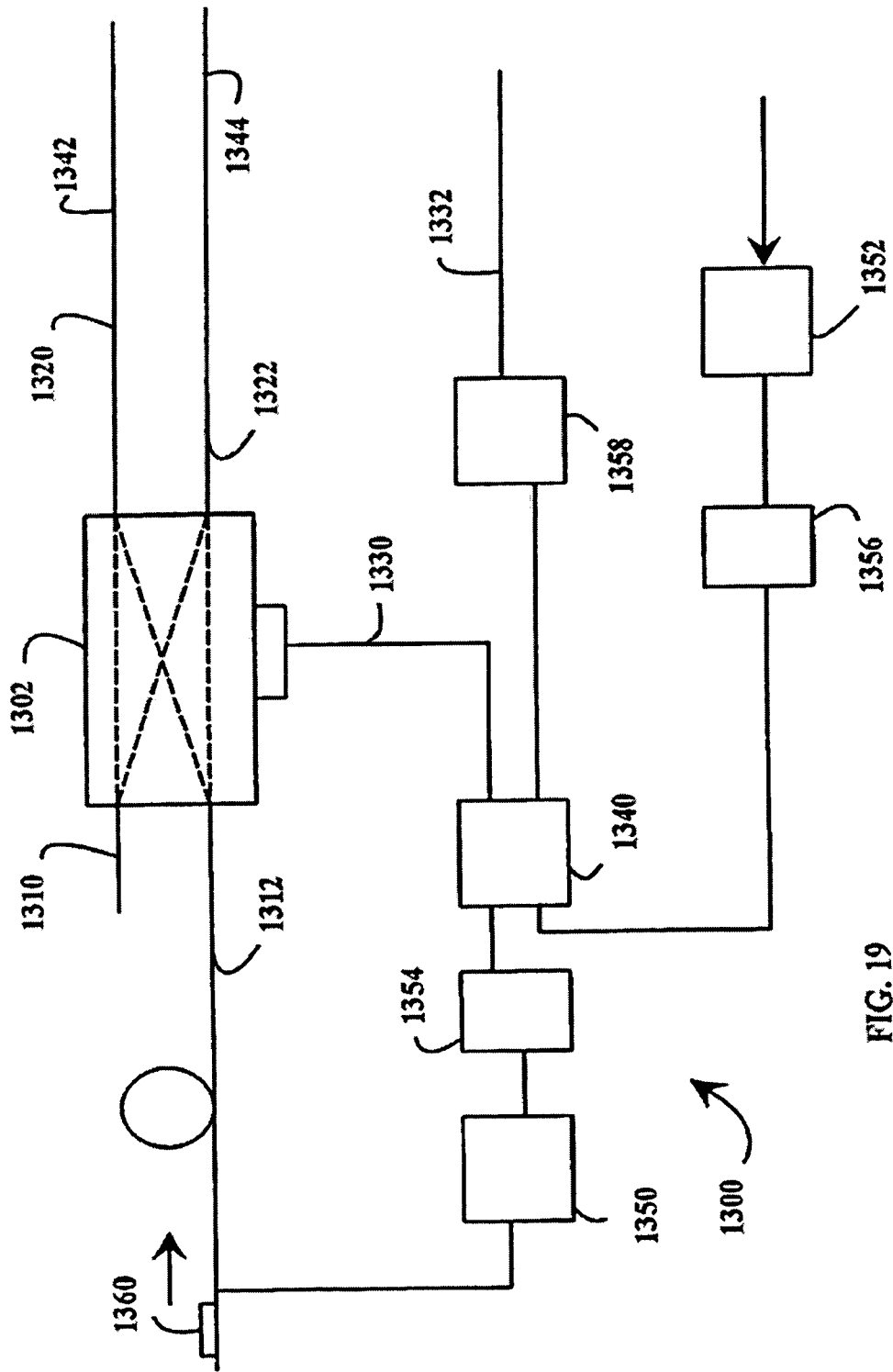
FIG. 19 is a pictorial diagram which illustrates the operation of a lithium niobate node, a first exemplary node structure.

One example of a node 1300 is shown, referring to FIG. 19, which includes a lithium niobate (LiNbO3) gate 1302. The lithium niobate gate 1302 has two data input terminals 1310 and 1312, two data output terminals 1320 and 1322 and one control input terminal 1330. Various control circuitry 1340 is added to the lithium niobate gate 1302 to form a control output terminal 1332 of the node 1300. Node 1300 also includes optical to electronic converters 1354, 1356 and 1358. The lithium niobate gate 1302 is forms a 2×2 crossbar. Data paths 1342 and 1344 are optical and the control of the node 1300 is electronic. The lithium niobate gate 1302 is combined with a photodetectors 1350 and 1352 and a few electronic logic components to form a node 1300 for various embodiments of an interconnect structure.

In operation, as a message packet 1360 approaches the node 1300, part of the message packet signal 1360 is split off and a sync bit 914 of the message packet header (shown in FIG. 18) designating a bit of the binary representation of destination ring in accordance with the discussion hereinbefore, is read by the photodetector 1350. This bit is converted from optical form to an electronic signal. This bit, a bit designating the cylinder height upon which the node 1300 lies and a bit designating whether a destination node on the next level is blocked are processed electronically and a result of the logical tests of these bits is directed to the control input terminal 1330 of the lithium niobate gate 1302. In a first type of lithium niobate gate technology, if the result signal is a logic zero, the gate switches in the cross state. In a second type of lithium niobate gate technology, a logic zero result signal switches the gate in a bar (straight through) state.

Figure 20:
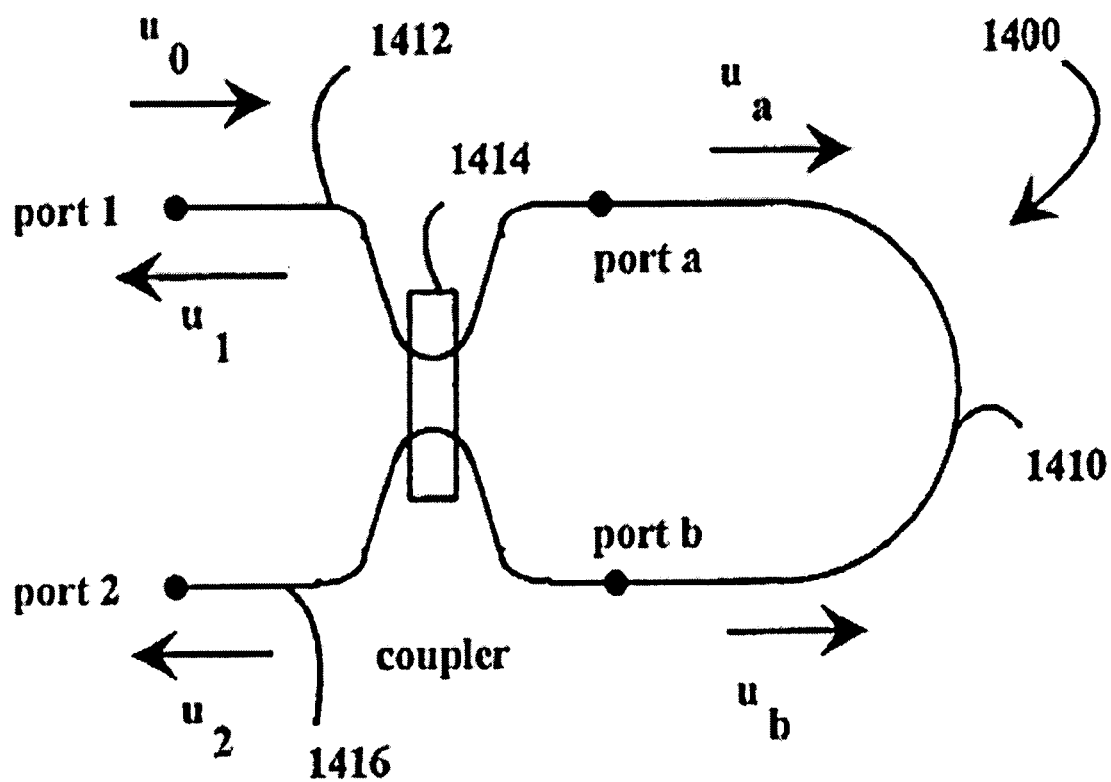
FIG. 20 is a pictorial diagram which illustrates the operation of a nonlinear optical loop mirror (NOLM), a second exemplary node structure.

Referring to FIG. 20, an additional example of a node 1400 is shown. Node 1400 uses a nonlinear optical loop mirror (NOLM) 1410 to perform a switching function. A nonlinear optical loop mirror is a device that makes use of the refractive index of a material to form a completely optical switch that is extremely fast. One example of a NOLM switch includes a data input terminal 1412 and a control input terminal 1414. Depending upon the signal at the control input terminal 1414, data either leaves the NOLM 1410 through the same data input terminal 1412 from which the data entered (hence the term mirror) or the data exits through a data output terminal 1416. Data is polarized and split into two signal "halves" of equal intensity. In the absence of a control pulse, the two halves of the signal recombine and leave the NOLM 1410 through the data input terminal 1414. When a control pulse is applied to the control input terminal 1414, the control pulse is polarized at right angles to the data pulse and inserted into the NOLM 1410 so that the control pulse travels with one half of the data pulse. The control pulse is more intense than the data pulse and the combined first half of the data pulse and the control pulse quickly pass the second half of the data pulse so that the second half of the data pulse is only minimally accelerated. Thus, the two halves of the data pulse travel with slightly different velocities and are 180° out of phase when the two halves are recombined. This phase difference causes the combined data pulse signal to pass through the data output terminal 1416. One disadvantage of the NOLM 1410 is that switching is operational only when a long optical transmission loop is employed, thus latency is a problem.

Figure 21:
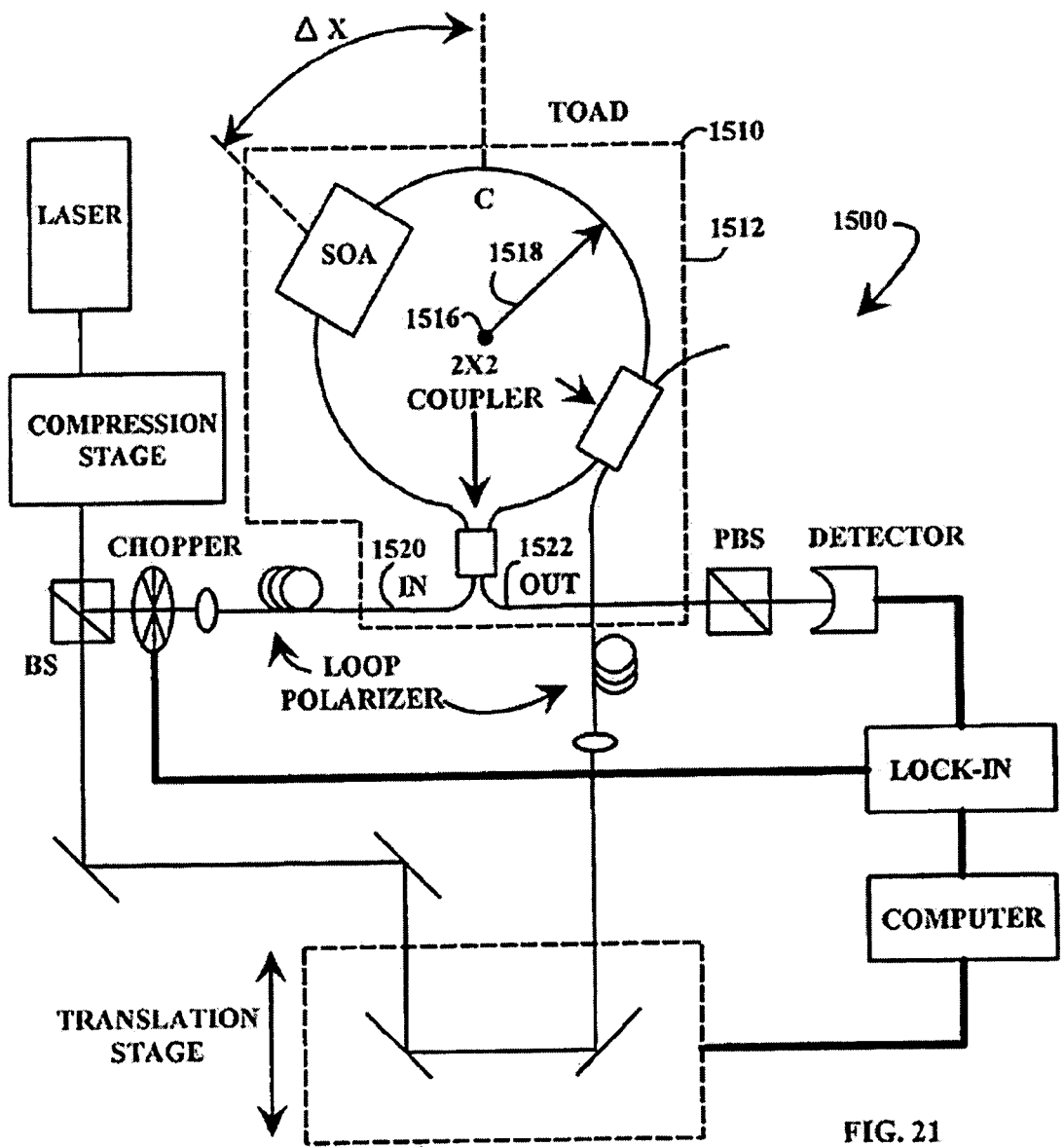
FIG. 21 is a pictorial diagram which illustrates the operation of a terahertz optical asymmetrical demultiplexer (TOAD) switch, a third exemplary node structure.

Referring to FIG. 21, another example of a node 1500 is shown which uses a terahertz optical asymmetrical demultiplexer (TOAD) switch 1510. The TOAD switch 1510 is a variation of the NOLM switch 1410. The TOAD 1510 includes an optical fiber loop 1512 and a semiconductor element 1514, a nonlinear element (NLE) or a semiconductor optical amplifier for example. The TOAD switch 1510 has an input data terminal 1520 which also serves as an output data port under some conditions. The TOAD switch 1510 also has a separate second output data terminal 1522. The semiconductor element 1514 is placed asymmetrically with respect to the center 1516 of the fiber optic loop 1512. A distance 1518 from the semiconductor element 1514 to the center 1516 of the fiber optic loop 1512 is the distance to transmit one bit of data. The TOAD 1510 functions by removing a single bit from a signal having a high data rate. The TOAD 1510 is switched by passing a constant electrical current through the semiconductor element 1514. An optical signal entering the semiconductor material causes the index of refraction of the material to immediately change. After the optical signal terminates, the index of refraction slowly (a time span of several bits) drifts back to the level previous to application of the optical signal. A control pulse is an optical signal having an intensity higher than that of an optical data signal and polarization at right angles to the optical data signal. An optical data input signal is polarized and split into two signal "halves" of equal intensity. The control pulse is injected in a manner to move through the fiber optic loop 1512 directly over the bit that is to be removed. Because the distance 1518 is exactly one bit long, one half of the split optical data signal corresponding to a bit leaves the semiconductor element 1514 just as the other half of the bit enters the semiconductor element 1514. The control pulse only combines with one half of the optical data signal bit so that the velocity of the two halves differs. The combined data and control signal bit exits the TOAD 1510 at the input data terminal 1520. Thus, this first bit is removed from the data path. A next optical signal bit is split and a first half and second half, moving in opposite directions, are delayed approximately the same amount as the index of refraction of the semiconductor element 1514 gradually changes so that this bit is not removed. After a few bits have passes through the semiconductor element 1514, the semiconductor material relaxes and another bit is ready to be multiplexed from the optical data signal. Advantageously, the TOAD 1510 has a very short optical transmission loop 1512.

Regenerators

It is a characteristic of certain nodes that messages lose strength and pick up noise as they propagate through the nodes. Using various other nodes, message signals do not lose strength but noise accumulates during message transmission. Accordingly, in various embodiments of the interconnect structure, signal regenerators or amplifiers are used to improve message signal fidelity after messages have passed through a number of nodes.

Figure 22:
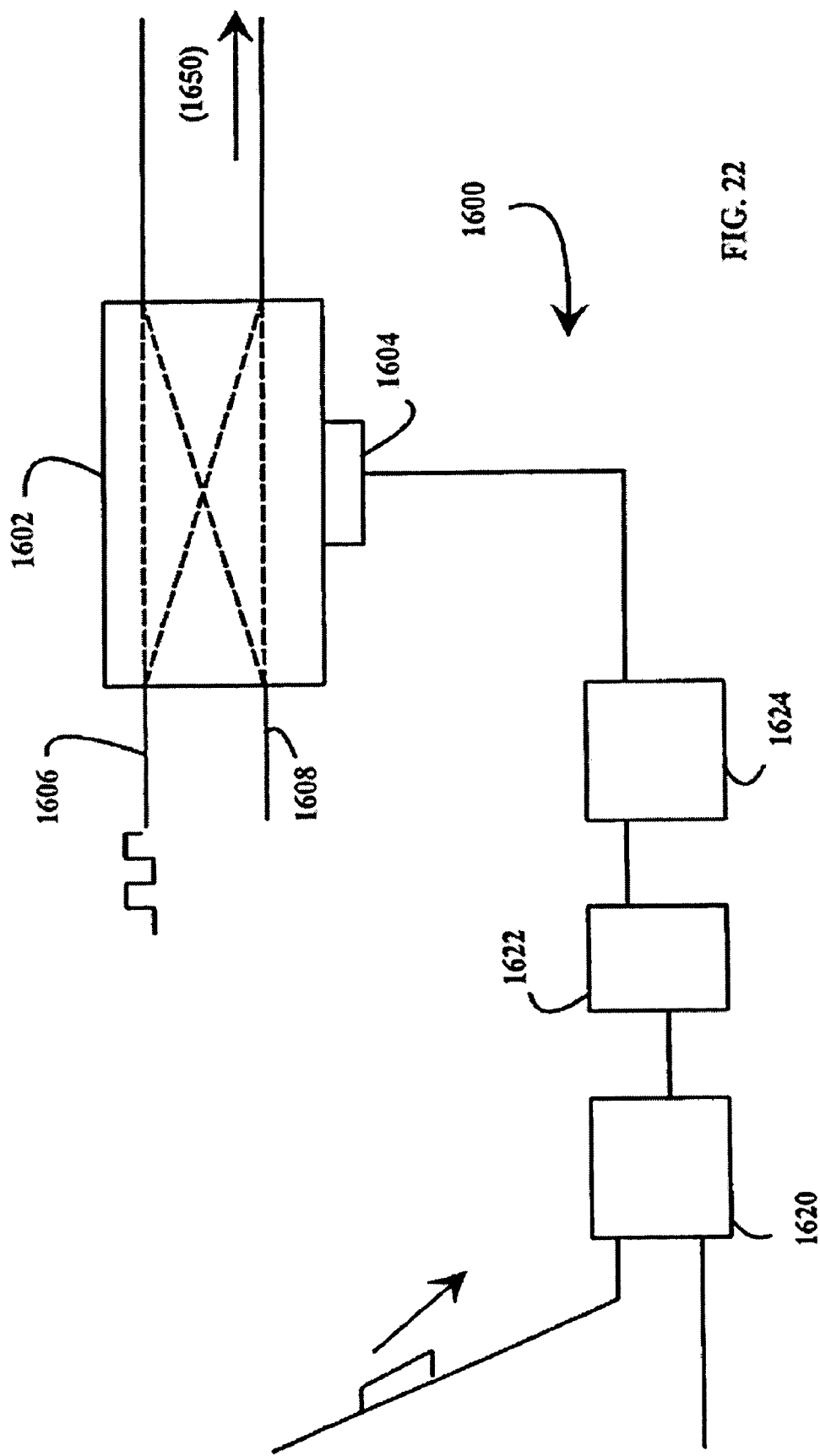
FIG. 22 is a pictorial diagram showing the operation of a regenerator utilizing a lithium niobate gate.

Referring to FIG. 22, one embodiment of a regenerator 1600 is shown which is constructed using a lithium niobate gate 1602. A lithium niobate gate 1602 regenerates message data having a transmission speed of the order of 2.5 gigabits. The lithium niobate gate 1602 detects and converts an optical message signal to an electronic signal which drives an electronic input port 1604 of the lithium niobate gate 1602. The lithium niobate gate 1602 is clocked using a clock signal which is applied to one of two optical data ports 1606 and 1608 of the gate 1602. The clock signal is switched by the electronic control pulses and a high fidelity regenerated signal is emitted from the lithium niobate gate 1602.

Typically, an interconnect structure utilizing a lithium niobate gate 1602 in a regenerator 1600 also uses lithium niobate gates to construct nodes. One large power laser (not shown) supplies high fidelity timing pulses to all of the regenerators in an interconnect structure. The illustrative regenerator 1600 and node 1650 combination includes an optical coupler 1620 which has a first data input connection to a node on the same level C as the node 1650 and a second data input connection to a node on the overlying level C+1. The illustrative regenerator 1600 also includes a photodetector 1622 connected to an output terminal of the optical coupler 1620, optical to electronic converter 1624 which has an input terminal connected to the optical coupler 1620 through the photodetector 1622 and an output terminal which is connected to the lithium niobate gate 1602. An output terminal of the lithium niobate gate 1602 is connected to a second lithium niobate gate (not shown) of a node (not shown). Two signal lines of the lithium niobate gate (not shown) are combined, regenerated and switched.

When regenerators or amplifiers are incorporated to improve signal fidelity and if the time expended by a regenerator or amplifier to recondition a message signal exceeds the time á–â, then the regenerator or amplifier is placed prior to the input terminal of the node and timing is modified to accommodate the delay.

Other Embodiments

The interconnect structure shown in FIGS. 1 through 16 is a simplified structure, meant to easily convey understanding of the principles of the invention. Numerous variations to the basic structure are possible. Various examples of alternative interconnect structures are discussed hereinafter, along with advantages achieved by these alternative structures.

Figure 23:
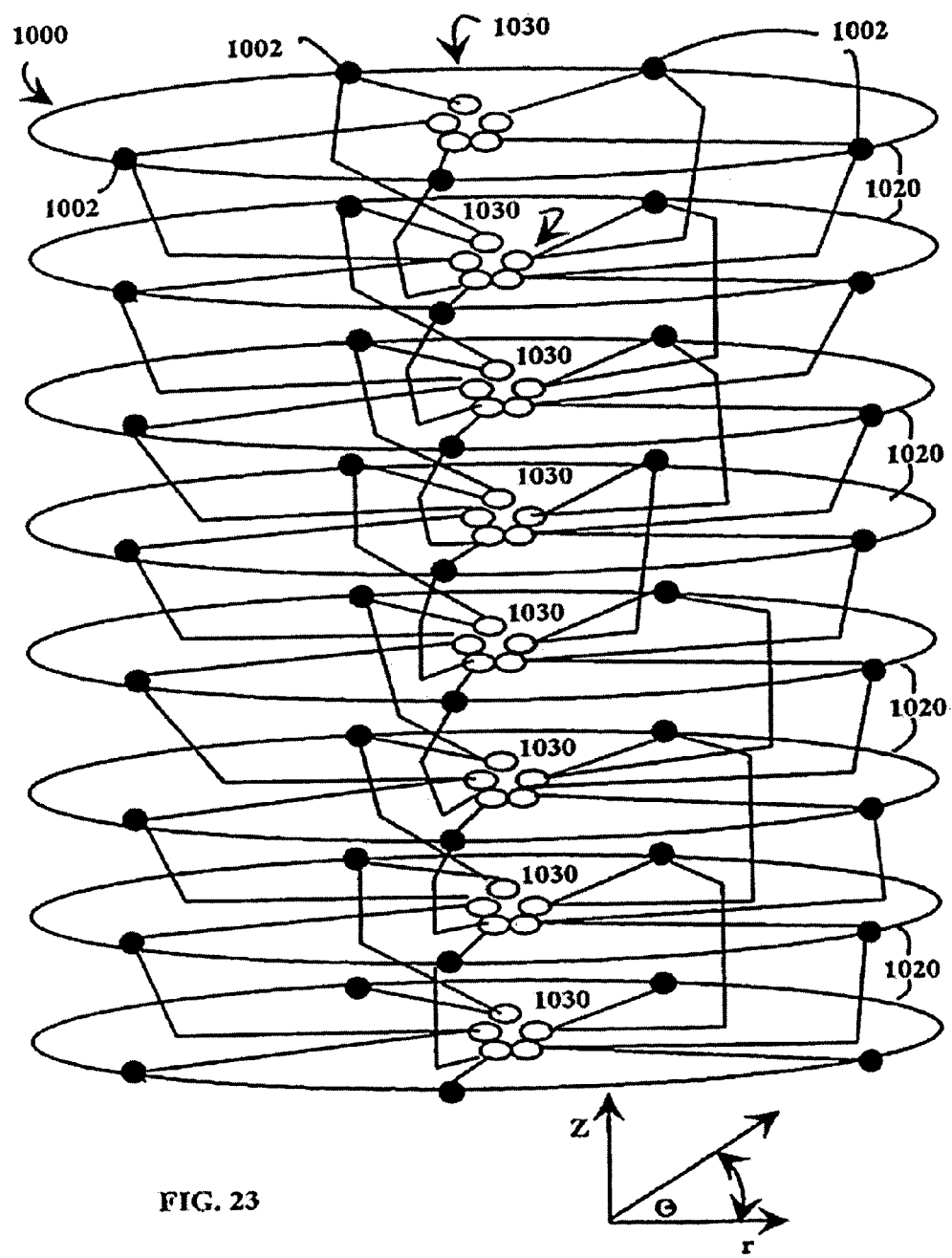
FIG. 23 is an abstract schematic pictorial diagram illustrating an alternative embodiment of an interconnect structure in which devices issue message packets to multiple nodes.

Referring to FIG. 23, an alternative embodiment of an interconnect structure 1000 includes devices 1030 which issue message packets to multiple nodes 1002 of the outermost level J. In the interconnect apparatus 100 shown in FIGS. 1 through 16, a device CU(è,z) initiates a message transmission operation by sending a message packet to a node N(J,è,z). In the alternative interconnect structure 1000, the device CU(è,z) initiates a message transmission operation by sending a message packet to node N(J,è,z) but, in addition, also includes interconnections to additional multiple nodes N(J',è',z') where z designates cylinder heights selected from heights 0 to $2^J$ of the outermost level J and è designates node angles selected from angles 0 to K of the heights z. In the case that a device sends messages to more than one node in the outermost level, the disclosed timing scheme maintains the characteristic that messages arrive at the target node at time zero modulus K.

Devices are connected to many nodes in the outermost level J to avoid congestion upon entry into the interconnect structure caused by multiple devices sending a series of messages at a high rate to nodes having converging data paths. In some embodiments, the nodes to which a device is connected are selected at random. In other embodiments, the multiple interconnection of a device to several nodes is selected in a predetermined manner. An additional advantage arising from the connection of a device to several nodes increases the input bandwidth of a communication network.

Figure 24:
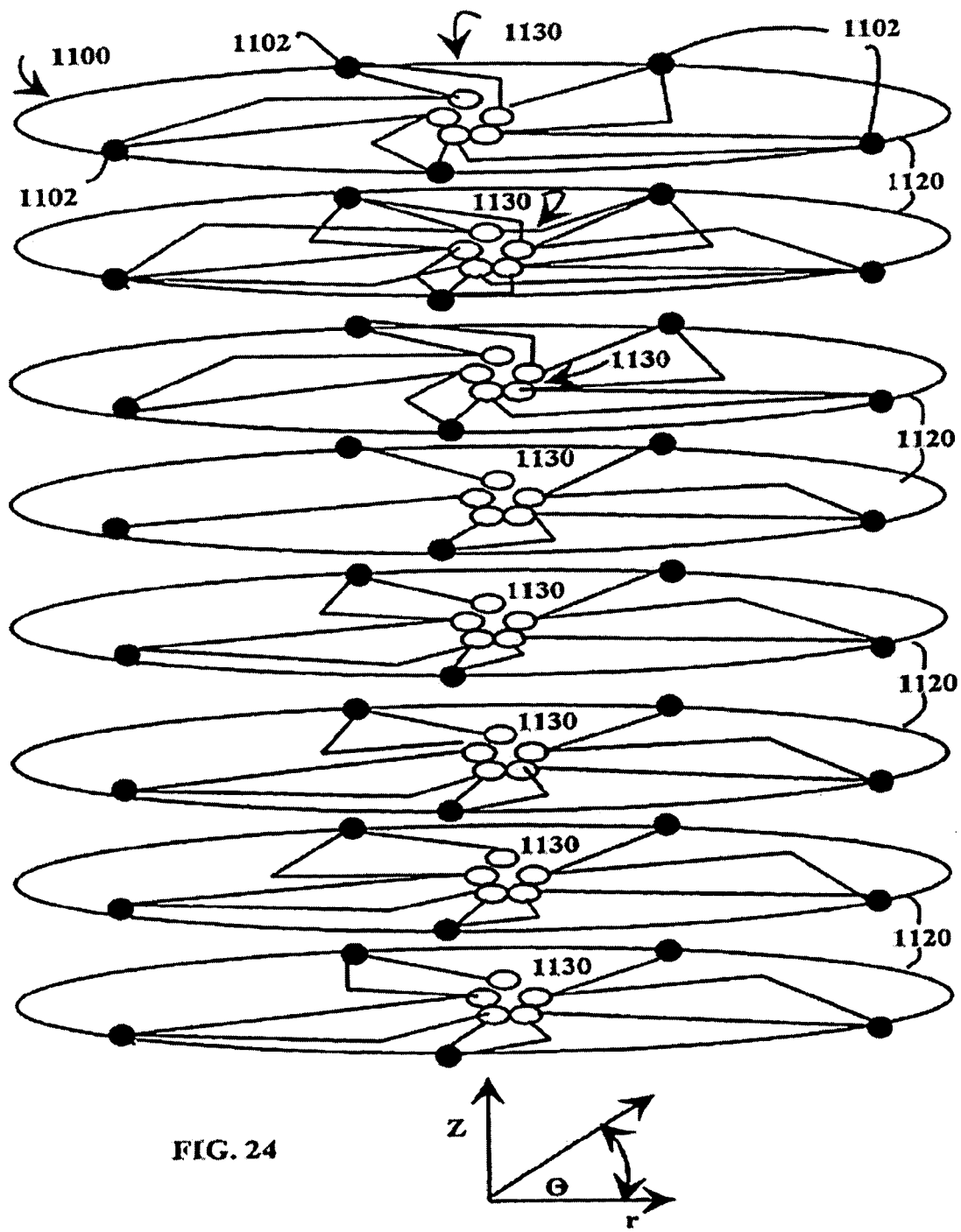
FIG. 24 is an abstract schematic pictorial diagram illustrating an alternative embodiment of an interconnect structure in which devices receive message packets from multiple nodes.

Referring to FIG. 24, an alternative embodiment of an interconnect structure 1100 includes devices 1130 which receive message packets from multiple nodes 1102 of the innermost level 0. In this example, the number of nodes K at a particular height z is nine and each device 1130 is connected to receive message from three nodes on level zero. The interconnect structure 1100 is advantageous for improving network exit bandwidth when the number of nodes K on at a particular height is large.

In the example in which the number of nodes K on a height z is nine and each device receives messages from three nodes on level zero, each node on ring zero is connected to a buffer that has three levels. At time 0, message data is injected into the level zero buffer. At time three, data is injected into the level one buffer. At time 6, data is injected into the level two buffer. A device CU(è,0) reads from the level zero buffer at node N(0,è,0), from the level one buffer at node N(0,(è+3) mod 9,0), and from the level two buffer at node N(0,(è+6)mod 9,0). This reading of message data is accomplished in a synchronous or nonsynchronous manner. If in the synchronous mode, a time t is expended to transfer data from the buffer to the device. In this case, the device CU(è,0) reads from the level zero buffer at time t, reads from the level three buffer at time 3+t, and reads from the level six buffer at time 6+t. In an asynchronous mode, device CU(è,0) interconnects to the three buffers as described hereinbefore and reads message data whenever a buffer signals that data is available.

Figure 25:
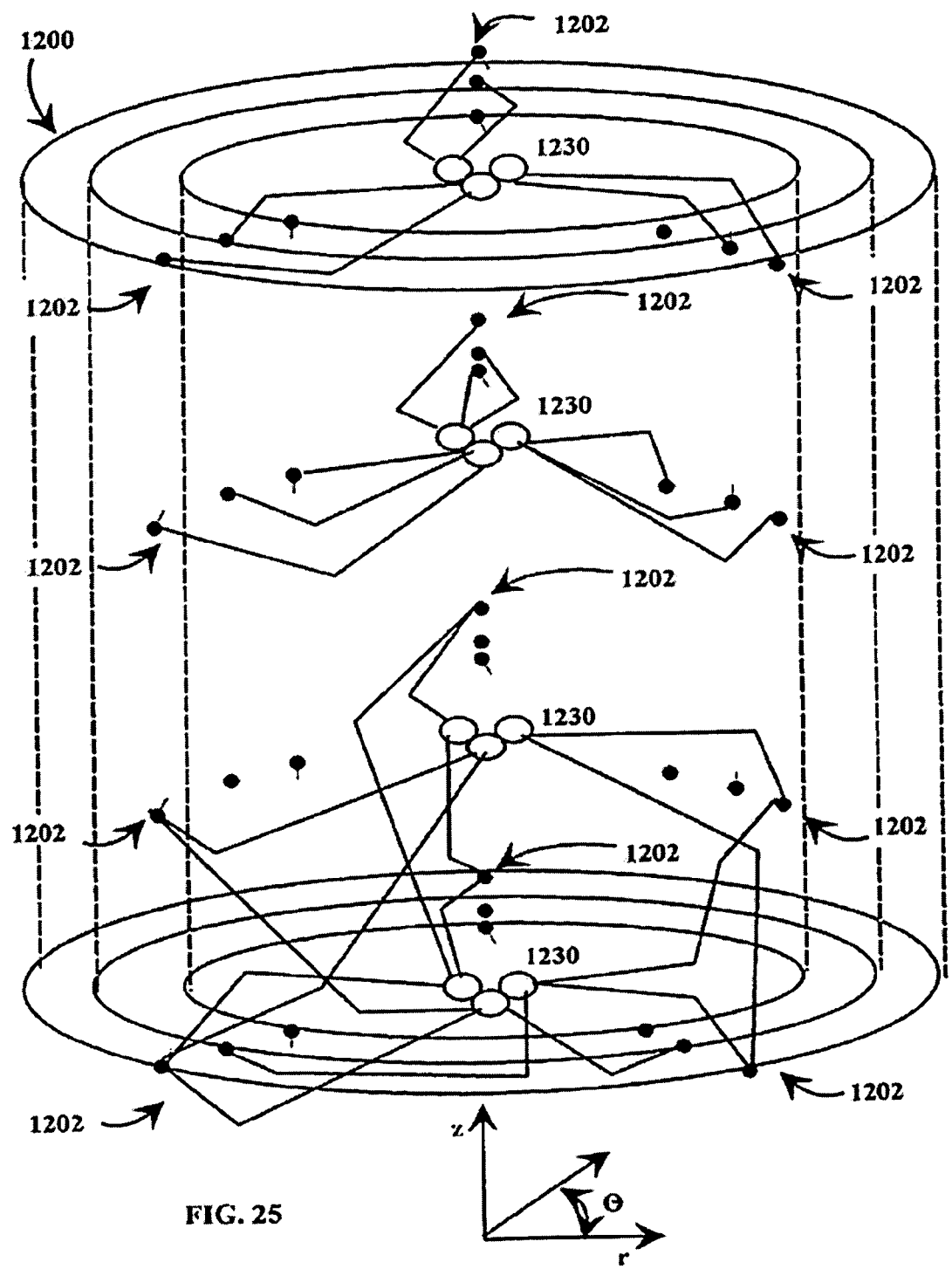
FIG. 25 is an abstract schematic pictorial diagram illustrating an alternative embodiment of an interconnect structure in which devices issue message packets to nodes at various interconnect levels.

Referring to FIG. 25, an alternative embodiment of an interconnect structure 1200 includes devices 1230 which issue message packets to multiple nodes 1202, not only in the outermost level J but also in other levels. In the alternative interconnect structure 1200, the device CU(è,z) initiates a message transmission operation by sending a message packet to node N(J,è,z) but, in addition, also includes interconnections to additional multiple nodes N(T,è,z) where T designates levels of the interconnect structure 1200, z designates cylinder heights selected from heights 0 to $2^J$ of the outermost level J and è designates node angles selected from angles 0 to K of the heights z. In the case that a device sends messages to nodes in more than level, message communication is controlled according to a priority, as follows. First, messages entering a node N(r,è,z) from the same level T have a first priority. Second, messages entering a node N(r,è,z) from a higher level T+1 have a second priority. Messages entering a node N(r,è,z) from a device CU(è,z) have last priority. The alternative embodiment of interconnect structure 1200 allows a device to send messages to neighboring devices more rapidly. The disclosed timing scheme maintains the characteristic that messages arrive at the node designated in the message header at time zero modulus K.

In these various embodiments, devices accept data from level zero nodes using one of various predetermined techniques. Some embodiments rely exclusively on timing to determine when the devices accept data so that devices accept data at time zero modulus K. Some embodiments include devices that accept message data at various predetermined times with respect to modulus K timing. Still other embodiments have devices that accept data whenever a buffer is ready to accept data.

Wave Division Multiplexing Embodiment

In another embodiment of an interconnect structure, message signal bandwidth is increased using wave division multiplexing. A plurality of K colors are defined and generated in a message signal that is transmitted using an interconnect structure having K devices at a cylinder height. Accordingly, each device is assigned a particular color. Message packets travel to a preselected target ring in the manner described hereinbefore for a single wavelength interconnect system. Message packets pass from level zero to the appropriate device depending on the color assigned to the message packet.

A message includes a header and a payload. The header and payload are distinguished by having different colors. Similarly, the payload is multiplexed using different colors, which are also different from the color of the header. Message bandwidth is also increased by combining different messages of different colors for simultaneous transmission of the messages. Furthermore, different messages of different colors are bound on a same target ring, combined an transmitted simultaneously. All messages are not demultiplexed at all of the nodes but, rather, are demultiplexed at input buffers to the devices.

Variable Base $i^J$ Height Structure Embodiment

In a further additional embodiment, an interconnect structure has $i^J$ cylindrical heights on a level for each of J+1 levels, where i is a suitable integer number such as 2 (the previously described embodiment), 3, 4 or more. As was described previously, each height contains K nodes, and each node has two data input terminals, two data output terminals, one control input terminal and one control output terminal.

For example, an interconnect structure may have $3^J$ heights per level. On level one, message data is communicated to one of three level zero heights. On level two, message data is communicated to one of nine level zero heights and so forth. This result is achieved as follows. First, the two output data terminals of a node N(r,è,z) are connected to input data terminals of a node N(T−1,è+1,z) and a node N(T,è+1,$h_T(z)$), in the manner previously discussed. However in this further embodiment, a third height transformation $h_T(h_T(h_T(z)))$ rather than a second height transformation $h_T(h_T(z))$ is equal to the original height designation z. With the nodes interconnected in this manner, the target ring is accessible to message data on every third step on level one. In an interconnect structure having this form, although nodes having two output data terminals are suitable, advantages are gained by increasing the number of output data terminals to three. Thus, one data output terminal of a node on a given level is connected to two nodes on that level and to one node on a successive level. Accordingly, each level has $3^J$ heights and a message packet and a message can descend to a lower level every other step.

In this manner, many different interconnect structures are formed by utilizing $i^J$ heights per level for various numbers i. Where i is equal to 4, the fourth height transformation $h_T(h_T(h_T(h_T(z))))$ is equal to the original height designation z. If i is 5, the fifth height transformation $h_T(h_T(h_T(h_T(h_T(z)))))$ is the same as the original height z, and so forth.

In the variable base $i^J$ height structure embodiment, whether the target ring is accessible from a particular node is determined by testing a more than one bit of a code designating the target ring.

Variable Base Transformation Technique Embodiment

In a still further embodiment of an interconnect structure, the height transformation technique outlined hereinbefore is modified as follows. In this embodiment, a base three notation height transform technique is utilized rather than the binary height transformation technique discussed previously. In the base three transformation technique, a target ring is designated by a sequence of base three numbers. Thus, one a level n, the n low-order base three numbers of the height designation are reversed in order, the low-order-bit-reversed height designation is incremented by one, and the n low-order base three numbers are reversed back again. An exemplary interconnect structure has four levels (J=3 plus one), nine heights ($3^J=3^3$) per level and five nodes (K=5) per height. In accordance with the base three height transformation technique, node $N_{23(201)}$ on level 2 has a first data input terminal connected to a data output terminal of node $N_{32(201)}$ on level 3, a second data input terminal connected to a data output terminal of node $N_{22(220)}$ on level two. Node $N_{23(201)}$ also has a first data output terminal connected to a data input terminal of node $N_{14(201)}$ on level one and a second data output terminal connected to a data input terminal of node $N_{24(211)}$. Node $N_{23(201)}$ also has a control input bit connected to a control output bit of node $N_{13(200)}$ and a control output bit connected to a control input bit of node $N_{33(211)}$. In this embodiment, the header includes a synch bit followed by the address of a target ring in base three. For example, the base three numbers are symbolized in binary form as 00, 01 and 10 or using three bits in the form 001, 010 and 100.

Further additional height transformation techniques are possible using various numeric bases, such as base 5 or base 7 arithmetic, and employing the number reversal, increment and reversal back method discussed previously.

Multiple Level Step Embodiment

In another embodiment, an interconnect structure of the nodes have ten terminals, including five input terminals and five output terminals. The input terminals include three data input terminals and two control input terminals. The output terminals include three data output terminals and two control output terminals. In this interconnect structure, nodes are generally connected among five adjacent cylindrical levels. Specifically, nodes N(T,è,z) at the T cylindrical level have terminals connected to nodes on the T, T+1, T+2, T−1 and T−2 levels. These connections are such that the nodes N(T,è,z) have data input terminals connected to nodes on the same level T, the next outer level T+1 and the previous outer level T+2. In particular, nodes N(T,è,z) have data input terminals connected to data output terminals of nodes N(T,è−1,$h_T$(z)), N(T+1,è−1,z) and N(T+2,è−1,z). Nodes N(T,è,z) also have control output terminals, which correspond to data input terminals, connected to nodes on the next outer level T+1 and the previous outer level T+2. Nodes N(T,è,z) have control output terminals connected to control input terminals of nodes N(T+1,è−1,z) and N(T+2,è−1,z). Nodes N(T,è,z) also have data output terminals connected to nodes on the same level T, the next inner level T−1 and the subsequent inner level T−2. In particular, nodes N(T,è,z) have data output terminals connected to data output terminals of nodes N(T,è+1,$H_T$(z)), N(T−1,è+1,z) and N(T−2,è+1,z). Nodes N(T,è,z) also have control input terminals, which correspond to data output terminals, connected to nodes on the next inner level T−1 and the subsequent inner level T−2. Nodes N(T,è,z) have control input terminals connected to control output terminals of nodes N(T−1,è+1,z) and N(T−2,è+1,z).

This ten-terminal structure applies only to nodes at the intermediate levels 2 to J−2 since nodes at the outer levels J and J−1 and at the inner levels 1 and 0 have the same connections as the standard six-terminal nodes.

This ten-terminal structure allows messages to skip past levels when possible and thereby pass through fewer nodes at the cost of increasing logic at the nodes. Only one message is allowed to enter a node at one time. The priority of message access to a node is that a message on the same level has top priority, a message from a node one level removed has second priority and a message from a node two levels away has last priority. Messages descend two levels whenever possible. The timing rules for an interconnect structure with ten terminals are the same as the timing rules using the six-terminal nodes. Advantages of the ten-terminal node interconnect structure are that messages pass more quickly through the levels.

Other interconnect structure embodiments include nodes having more than ten terminals so that data and control terminals are connected to additional nodes on additional levels. For example, various nodes N(T,è,z) also have associated control input terminals and data output terminals, which are connected to nodes on inner levels T−3, T−4 and so on. In other examples, various nodes N(T,è,z) also have associated control output terminals and data input terminals, which are connected to nodes on outer levels T+3, T+4 and so on. In various interconnect structure embodiments, nodes may be connected among all levels or selected levels.

Multiple Interconnections to the Same Level Embodiment

Additional interconnect structure embodiments utilize additional interconnections among nodes on the same level. Specifically, nodes N(T,è,z) on the level T have interconnections in addition to the connections of (1) an output data terminal connected to an input data terminal of nodes N(T,è+1,$h_T$(z)) and (2) an input data terminal connected to an output data terminal of nodes N(T,è−1,$H_T$(z)). Thus nodes N(T,è,z) on the level T have interconnections including a connection of (1) an output data terminal connected to an input data terminal of nodes N(T,è+1,$g_T$(z)) and (2) an input data terminal connected to an output data terminal of nodes N(T,è−1,$h_T$(z)). Like cylinder height $h_T$(z), height $g_T$(z) is on the half of the interconnect structure of level T that is opposite to the position of height z (meaning bit T of the binary code describing height $h_T$(z) and $g_T$(z) is complementary to bit T of height z).

Multiple Interconnections to a Next Level Embodiment

A multiple interconnections to a next level embodiment is similar to the multiple interconnections to the same level embodiment except that node N(T,è,z) has one output data terminal connected to one node N(T,è+1,$h_T$(z)) on level T and two output data terminals connected to two nodes N(T−1,è+1,z) and N(T−1,è+1,$g_{T-1}$(z)) on level T−1. Thus one data output interconnection traverses the same level, a second interconnection progresses one level and a third interconnection both progresses one level and traverses. Like height $h_T$(z), height $g_T$(z) is on the half of the interconnect structure of level T that is opposite to the position of height z. Conflicts between node access are resolved by applying a first priority to messages moving on the same level, a second priority to messages progressing one level and a third priority to messages both progressing one level and traversing.

The description of certain embodiments of this invention is intended to be illustrative and not limiting. Numerous other embodiments will be apparent to those skilled in the art, all of which are included within the broad scope of this invention. For example, many different types of devices may be connected using the interconnect structure including, but not limited to, workstations, computers, terminals, ATM machines, elements of a national flight control system and the like. Also, other interconnection transformations other than $h_T$ and $H_T$ may be implemented to describe the interconnections between nodes.

The description and claims occasionally make reference to an interconnect structure which is arranged in multiple dimensions. This reference to dimensions is useful for understanding the interconnect structure topology. However, these dimensions are not limited to spatial dimensions but generally refer to groups of nodes which are interconnected in a particular manner.

The invention claimed is:

1. An interconnect structure S containing a plurality of nodes and a plurality of interconnects selectively coupling the nodes, the interconnect structure S comprising:
   a node set T;
   an interconnect set I that selectively connects nodes in the node set T;
   a device set A mutually exclusive of the node set T with each device in the device set A sending data to one or more nodes in the node set T;
   a device set Z mutually exclusive of the node set T with each device in the device set Z receiving data from one or more nodes in the node set T; and
   a collection C of node subsets of the node set T, each node in the node set T being contained in exactly one member of the collection C such that:
   for a device x in the device set Z, a sequence $cx=cx_0, cx_1, cx_2, \ldots, cx_J$ exists with each member of the sequence cx being a node set in the collection C, the sequence cx passing data from devices in the device set A to the device x on a plurality of paths, among the plurality of paths being a path set P(x) characterized in that a path R is included in the path set P(x) only if each node on the path R is in a member of the sequence cx, a node of the path R that receives a message directly from a device in the device set A being a member of node set $cx_L$ and a node of the path R that sends data directly to the device x being a member of node set $cx_V$ with U being larger than V;
   for a member Y of the collection C, a corresponding set of devices Z(Y) exists in the device set Z such that a device y is included in the set of devices Z(Y) only if the member Y is also a member of a sequence cy;
   for members $cx_H$ and $cx_K$ of the sequence cx with H>K, a device set $Z(cx_K)$ is a subset of a device set $Z(cx_H)$;
   the sequence cx includes two members $cx_L$ and $cx_m$ with L>M and with a device set $Z(cx_M)$ being a subset of a device set $Z(cx_L)$ and a device exists in the device set $Z(cx_L)$ that is not included in the device set $Z(cx_M)$; and
   the node set T includes three distinct nodes p, q, and r, the node p being in a member $cx_D$ of the sequence cx, the nodes q and r being in a member $cx_E$ of the sequence cx with D>E, in one path of the plurality of paths P(x) a message moves directly from the node, p to the node r and in another path of the plurality of paths P(x) a message moves directly from the node q to the node r.

2. An interconnect structure according to claim 1 wherein:
   the plurality of paths of the sequence cx include a path such that if a message hops from a node in a member $cx_n$ to a node in a member $cx_m$, then n>m.

3. An interconnect structure according to claim 1 further comprising:
   an arrangement of the nodes in the interconnect structure into a hierarchy of levels of node sets $LV=LV_0, LV_1, \ldots LV_J$, each member of the hierarchy LV being a node set that is subset of the node set T and each node in the node set T is contained in exactly one member of the node sets LV; and
   for the device x of the device set Z a node set $cx_N$ is a subset of a level N node set $L_N$, with N not exceeding J.

4. An interconnect structure according to claim 3 wherein:
   the collection C includes $2^{J-N}$ members on a level N;
   the collection C includes three members D, E and F such that member node set D is on a level $LV_N$ and member node sets E and F are on a level $LV_{N-1}$;
   the interconnect set I includes interconnects positioned to allow data to pass directly from the member node set D to the member node set E and to pass directly from the node set D to the node set F; and
   the device set Z includes device sets Z(D), Z(E), and Z(F) that correspond to the three members D, E, and F, the device sets Z(E) and Z(F) being mutually exclusive device sets, and the device set Z(D) is the union of the device sets Z(E) and Z(F).

5. An interconnect structure according to claim 1 further comprising:
   a logic $L_p$ associated with the node p wherein for a message Mp that arrives at the node p, the logic Lp uses information concerning the sending of messages from the node q for the logic Lp to determine where the node p is to send the message Mp.

6. An interconnect structure according to claim 1 wherein:
   the node q has priority over the node p to send data to the node r so that a message Mq located at the node q is not blocked from being sent to the node r by a message Mp at the node p; and
   the node q sends a control signal to the node p wherein the purpose of the control signal is to enforce the priority of the node q over the node p to send data to the node r.

7. An interconnect structure according to claim 1 wherein:
   the node set T includes a node s distinct from the nodes p, q, and r, the node s being in the member $cx_D$, so that in one path of the plurality of paths P(x), a message moves from the node p directly to the node s.

8. An interconnect structure comprising:
   a plurality of nodes including a node $N_E$ and a node set P, the node set P including a plurality of nodes that send data to the node $N_E$; and
   a plurality of interconnect paths interconnecting the plurality of nodes, the interconnect paths including data interconnect paths that couple nodes in pairs, a node pair including a sending node and a receiving node, the sending node sending data to the receiving node;
   the nodes in the node set P having a priority relationship for sending data to the node $N_E$, the nodes in the node set P including distinct nodes $N_F$ and $N_A$, the node $N_F$ having a highest priority among the nodes in the node set P for sending data to the node $N_E$ so that a message $M_F$ arriving at the node $N_F$ is not blocked from traveling to the node $N_E$ by a message $M_A$ arriving at the node $N_A$; and
   for a message M arriving at the node $N_A$ and the message M is blocked front being sent to the node $N_E$, then the blocking of the message M from being sent to the node $N_E$ causes sending of the message M from the node $N_A$ to a node distinct from the node $N_E$, wherein:
   when a message M arrives at the node $N_A$ and is targeted for the node $N_E$ and not blocked by a message M' arriving at a node in the node set P having a higher priority than the node $N_A$ for sending messages to the node $N_E$, the node $N_A$ sends the message M to the node $N_E$.

9. An interconnect structure S containing a plurality of nodes and a plurality of interconnects selectively coupling the nodes, the interconnect structure comprising:
   a node set T;
   an interconnect set I that selectively connects nodes in the node set T;
   a device set A mutually exclusive with the node set T with each device in the device set A sending data to a node in the node set T;
   a device set Z mutually exclusive with the node set T with each device in the device set Z receiving data from a node in the node set T;
   a set of data paths P, each path of the path set P carrying data from a device in the device set A to a device in the device set Z, each node on the path of the path set P, is included in the node set T, and each interconnect in the path is included in the interconnect set I;
   a node set U characterized as the set of nodes within the node set T that are on a path included in the path set P;
   for a node N in the node set T such that the node N is on a path in the path set P, a corresponding set of devices Z(N) exists in the device set Z such that a device w is included in the device set Z(N) only if a path exists in the path set P from a member of the device set A to the device w such that the path contains the node N;
   the node set U includes three distinct nodes $N_A$, $N_D$, and $N_E$ such that the node $N_A$ sends data to the node $N_D$ and the node $N_E$, and a device set $Z(N_A)$ is the same as a device set $Z(N_D)$, and a device set $Z(N_E)$ is a proper subset of the device set $Z(N_A)$;
   an interconnect link IL in interconnect set I, the interconnect link IL being an interconnect link on a path in the path set P such that a corresponding set of devices Z(IL) exists in the device set Z such that a device w is included in the device set Z(IL) only if a path containing the interconnect link IL in the path set P exists from a device in the device set A to the device w; and
   the node set U includes distinct nodes $N_A$, $N_D$, and $N_E$ such that the node $N_A$ sends data to the node $N_D$ on a link $L_{AD}$, the node $N_A$ sends data to the node $N_E$ on a link $L_{AE}$, and a device set $Z(L_{AE})$ is a proper subset of a device subset $Z(L_{AD})$.

10. An interconnect structure S comprising:
   a plurality of nodes including nodes $N_A$, $N_D$, and $N_E$;
   a plurality of interconnect lines selectively coupling the nodes in the structure S;
   a plurality of devices in a device set I that is mutually exclusive of the plurality of nodes, the devices in the device set I sending data to one or more of the plurality of nodes; and
   a plurality of devices in a device set Z that is mutually exclusive of the plurality of nodes, the devices in the device set Z receiving data from one or more of the plurality of nodes, the device set Z comprising a plurality of device subsets further comprising:
      a device subset $T_A$ consisting of devices $t_A$ such that a message can be sent from a device in the device set I through the node $N_A$ to the devices $t_A$;
      a device subset $T_D$ consisting of devices $t_D$ such that a message can be sent from a device in the device set I through the node $N_A$ to the devices $t_D$; and
      a device subset $T_E$ consisting of devices $t_E$ such that a message can be sent from a device in the device set I through the node $N_E$ to the devices $t_E$;
   wherein:
      the node $N_A$ sends data to the node $N_D$;
      the node $N_A$ sends data to the node $N_E$;
      the devices in the device subset $T_A$ are included in the device subset $T_D$; and
      a device $t_A$ exists that is included in the device subset $T_A$ and excluded from the device subset $T_E$.

11. An interconnect structure S according to claim 10 further comprising:
   a logic L that controls passage of messages sent through the interconnect structure S, wherein:
      a plurality of messages P can be sent to a plurality of nodes from a plurality of devices in the device set I;
      the plurality of messages P includes a message $M_A$ having a target device in the device subset $T_A$; and
      the logic L routs the message $M_A$ through the node $N_A$ to a device in the device subset $T_A$.

12. An interconnect structure S according to claim 11 wherein:
   the message $M_A$ has a header; and
   the logic L routs the message $M_A$ through the interconnect structure S using information in the header of the message $M_A$.

13. An interconnect structure S according to claim 11 wherein:
   the logic L is distributed among one or more nodes of the plurality of nodes;
   the plurality of nodes includes a node N; and
   logic of the logic L associated with the node N uses control signals to route messages though the node N.

14. An interconnect structure S containing a plurality of nodes and a plurality of interconnects selectively coupling the nodes, the interconnect structure S comprising:
   a node set T including three distinct nodes $N_A$, $N_D$, and $N_E$;
   a device set I mutually exclusive of the node set T and containing devices that send data to at least one node in the node set T;
   a device set Z mutually exclusive of the node set T and containing devices that receive data from at least one node in the node set T;
   a plurality of paths P that carry data through the interconnect structure S to devices in the device set Z;
   a device subset $T_A$ exists such that a message can be sent on a path in the paths P from a device in the device set I through the node $N_A$ to a device in the device subset $T_A$;
   a device subset $T_D$ exists such that a message can be sent on a path in the paths P from a device in the device set I through the node $N_D$ to a device in the device subset $T_D$;
   a device subset $T_E$ exists such that a message can be sent on a path in the paths P from a device in the device set I through the node $N_E$ to a device in the device subset $T_E$;
   wherein:
      the node $N_A$ sends data to the node $N_D$ along a path in the paths P;
      the node $N_A$ sends data to the node $N_E$ along a path in the paths P;
      the devices in the device subset $T_A$ are included in the device subset $T_D$; and
      a device exists that is included in the device subset $T_A$ that is not included in the device subset $T_E$.

15. An interconnect structure S according to claim 14 further comprising:
   a logic $L_A$ associated with the node $N_A$ controls data flow from the node $N_A$.

16. An interconnect structure S containing a plurality of nodes and a plurality of interconnects selectively coupling the nodes, the interconnect structure S comprising:
   a node set T including three distinct nodes $N_A$, $N_C$, and $N_E$;

a device set I mutually exclusive of the node set T and containing devices that send data to at least one node in the node set T;

a device set Z mutually exclusive of the node set T and containing devices that receive data from at least one node in the node set T;

a plurality of paths P that carry data through the interconnect structure S to devices in the device set Z;

a device subset $T_A$ exists such that a message can be sent on a path in the paths P from a device in the device set I through the node $N_A$ to a device in the device subset $T_A$;

a device subset $T_C$ exists such that a message can be sent on a path in the paths P from a device in the device set I through the node $N_C$ to a device in the device subset $T_C$;

a device subset $T_E$ exists such that a message can be sent on a path in the paths P from a device in the device set I through the node $N_E$ to a device in the device subset $T_E$;

wherein:

the node $N_C$ sends data to the node $N_E$ along a path in the paths P;

the node $N_A$ sends data to the node $N_E$ along a path in the paths P;

the devices in the device subset $T_C$ are included in the device subset $T_E$; and a device exists that is included in the device subset $T_A$ that is not included in the device subset $T_E$.

17. An interconnect structure S according to claim 16 further comprising:

a logic $L_A$ associated with the node $N_A$ controls data flow from the node $N_A$.

18. An interconnect structure S according to claim 17 wherein:

a message M arriving at the node $N_A$ has a header and the logic $L_A$ uses information in the header to decide where to send the message M.

19. An interconnect structure S according to claim 17 wherein:

the logic $L_A$ uses information from the node $N_C$ to decide where to send the message M.

* * * * *